US012662568B2

(12) United States Patent
Huang et al.

(10) Patent No.: US 12,662,568 B2
(45) Date of Patent: Jun. 23, 2026

(54) STABILE SILANE MODIFIED POLYMER COMPOSITION AND METHOD

(71) Applicant: Momentive Performance Materials Inc., Waterford, NY (US)

(72) Inventors: Misty Weiyu Huang, New City, NY (US); Lesley Hwang, Chappaqua, NY (US); Matthew J. Pinnow, Millwood, NY (US)

(73) Assignee: MOMENTIVE PERFORMANCE MATERIALS INC., Waterford, NY (US)

( * ) Notice: Subject to any disclaimer, the term of this patent is extended or adjusted under 35 U.S.C. 154(b) by 1132 days.

(21) Appl. No.: 16/851,742

(22) Filed: Apr. 17, 2020

(65) Prior Publication Data

US 2020/0332052 A1 Oct. 22, 2020

Related U.S. Application Data

(60) Provisional application No. 62/836,293, filed on Apr. 19, 2019.

(51) Int. Cl.

| | |
|---|---|
| ***C08G 18/71*** | (2006.01) |
| ***C08G 18/24*** | (2006.01) |
| ***C08G 18/28*** | (2006.01) |
| ***C08G 18/30*** | (2006.01) |
| ***C08G 18/48*** | (2006.01) |
| ***C08G 18/66*** | (2006.01) |
| ***C08J 3/00*** | (2006.01) |
| ***C08J 3/22*** | (2006.01) |
| ***C08K 5/00*** | (2006.01) |
| ***C08K 5/37*** | (2006.01) |
| ***C08L 75/04*** | (2006.01) |
| ***C08L 75/08*** | (2006.01) |

(52) U.S. Cl.

CPC ......... *C08G 18/718* (2013.01); *C08G 18/242* (2013.01); *C08G 18/246* (2013.01); *C08G 18/289* (2013.01); *C08G 18/307* (2013.01); *C08G 18/48* (2013.01); *C08G 18/4825* (2013.01); *C08G 18/4845* (2013.01); *C08G 18/6666* (2013.01); *C08K 5/005* (2013.01); *C08K 5/37* (2013.01); *C08L 75/04* (2013.01); *C08L 75/08* (2013.01); *C08J 3/005* (2013.01); *C08J 3/226* (2013.01)

(58) Field of Classification Search

CPC C08G 18/718; C08G 18/242; C08G 18/4845; C08G 18/246; C08G 18/4825; C08G 18/289; C08G 18/307; C08G 18/48; C08G 18/6666; C08K 5/005; C08K 5/37; C08L 75/04; C08L 75/08; C08J 3/005; C08J 3/226

See application file for complete search history.

(56) References Cited

U.S. PATENT DOCUMENTS

| | | | | |
|---|---|---|---|---|
| 4,081,429 | A | 3/1978 | Wyman et al. | |
| 8,232,362 | B2 | 7/2012 | Yang et al. | |
| 9,321,878 | B2 | 4/2016 | Huang et al. | |
| 10,428,252 | B2 | 10/2019 | Burckhardt | |
| 2015/0166719 | A1* | 6/2015 | Huang .................. | C09J 175/08 524/588 |

FOREIGN PATENT DOCUMENTS

| | | | | |
|---|---|---|---|---|
| CN | 107841277 A * | 3/2018 | ........... | C08G 18/289 |
| JP | 2007063281 A | 3/2007 | | |
| JP | 2008019362 A | 1/2008 | | |
| JP | 2017536440 A | 12/2017 | | |
| WO | 2018049375 A1 | 3/2018 | | |

OTHER PUBLICATIONS

Burkhalter; "Controlled tin catalyzed hydrolysis of 3-acryloxypropyltrimethoxysilane with mono- and multi-functional mercaptans"; Journal of Organometallic Chemistry 724 (2013) 213-224.
Roessing et al.; "New polymers with a fexible backbone"; Adhesives & Sealants Feb. 2011; 10-13.
Claims from U.S. Appl. No. 16/878,096, filed May 19, 2020.
International Search Report and Written Opinion from PCT/US2020/028726 mailed Sep. 3, 2020.
Unfavorable Opinion published Nov. 12, 2024 from the Brazilian PTO.

* cited by examiner

*Primary Examiner* — Rabon A Sergent
(74) *Attorney, Agent, or Firm* — James C. Abruzzo

(57) ABSTRACT

An alkoxysilyl-containing polyurethane polymer composition is prepared using a urethane-forming organometallic catalyst which is then stabilized to moisture exposure by the addition of a mercapto-containing compound. The stabilized moisture-curable alkoxsilyl-containing polyurethane polymer composition is activated to moisture curing by the addition of a hydrolysis and condensation catalysts. The stabilized moisture-curable alkoxsilyl-containing polyurethane polymer composition is useful as a component in the preparation of coatings, adhesives, sealants, consumer goods and industrial goods.

26 Claims, No Drawings

STABILE SILANE MODIFIED POLYMER COMPOSITION AND METHOD

FIELD OF THE INVENTION

This invention relates to the field of alkoxysilyl-containing polymer compositions, in particular, alkoxysilyl-containing polyurethane polymer compositions, and methods for making those alkoxysilyl-containing polymers more stable.

BACKGROUND OF THE INVENTION

Alkoxysilyl-containing polymers have desirable properties provided by the crosslinking of the polymers through hydrolysis and condensation reactions of the alkoxysilyl group. Moisture-curable compositions, based on alkoxysilyl-containing polymers, are known. Such polymers undergo hydrolysis and condensation on contact with moisture, typically in the presence of a cure catalyst. Conventional catalysts for curing alkoxysilyl-containing polymers include organometallic compounds containing metals such as tin, nickel, cobalt, aluminum, iron or bismuth. Organotin compounds such as, e.g., dibutyltin dilaurate (DBTDL), dioctyltin dilaurate (DOTDL), dibutyltin diacetate (DBTDA) and dibutyltin(II) oxide (DBTO) are typically used as catalysts to accelerate the curing of a number of different alkoxysilyl-containing silicone and non-silicone resins and moisture-curable compositions such as coatings, sealants and adhesives formulated with such resins.

When employing aliphatic isocyanato-functional alkoxysilanes to modify hydroxyl functional polymers or when polyisocyanates are employed to chain extend polyols or endblock the polyol to isocyanate-containing intermediates, which subsequently are silylated, metal urethane-forming catalysts are used to accelerate the reaction of the isocyanate with the hydroxyl group. These urethane-forming metal catalysts include organometallic compounds, such as a metal salt or a metal complex. These metal urethane-forming catalysts often remain in the polymer matrix after silylation reactions are complete. These same catalysts can subsequently catalyze both the hydrolysis and condensation reactions of the alkoxysilyl functional groups. Hydrolysis and condensation reactions can lead to poor shelf stability and/or premature curing during the processing of the alkoxysilyl-containing polymer.

One approach to stabilizing these polymers has been to incorporate low molecular weight silane additives, such as vinyltrimethoxysilanes or methyltrimethoxysilanes, to increase moisture stability. Water typically reacts faster with these silane additives than with the alkoxysilyl functional group on the polymer. Therefore, these silane additives can scavenge the water from the system, before the water becomes involved in premature hydrolysis and condensation reactions. However, these silane additives require relatively high loadings to be effective and therefore may increase tack-free times, affect cured properties and give rise caused safety concerns. Accordingly, for these and other reasons, they have not proved to be fully satisfactory.

Another approach is to poison the catalyst using sulfur or other sulfur containing compounds. However, these poisons may inhibit or completely deactivate the hydrolysis and condensation catalysts which may result in poor cure rates.

Therefore, there remains a need for methods and compositions to prevent the premature curing of the alkoxysilyl-containing polymer compositions, which employs organometallic urethane-forming catalysts in the preparation of the polymers, during handling and formulating of coating, adhesives, sealants and other goods, but also to provide for fast cure of the formulated products after exposure to moisture.

SUMMARY OF THE INVENTION

In accordance with an aspect of the present invention, an alkoxysilyl-containing polyurethane polymer composition is prepared using an organometallic compound, such as a metal salt or a metal complex, as urethane-forming catalyst, and subsequently is stabilized by adding mercapto-containing compounds, especially mercapto-containing alkoxysilanes, to the composition, while maintaining or improving the cure rate when organometallic compounds, such as metal salts or metal complexes, are added to the composition as hydrolysis and condensation catalysts. The cure rates of the present invention are compared to composition which do not contain the mercapto-containing compounds.

The alkoxysilyl-containing polyurethane is prepared from the reaction of a polyol with isocyanato-containing alkoxysilane or the reaction of isocyanato-containing polymer with an amino- or ureido-containing alkoxysilane.

The polyol may be a polyester polyol, polyether polyol, polycarbonate polyol, polybutadiene polyol, polybutylene polyol, polyol derived from polystyrene/butadiene copolymer, polyisoprene polyol, poly(meth)acrylate polyol, polyisocyanate extended polyester polyol, polyisocyanate extended polyether polyols, polyisocyanate extended polycarbonate polyol, polyisocyanate extended polyol derived from polystyrene/butadiene copolymer, polyisocyanate extended polyisoprene polyol, polyisocyanate extended poly (meth)acrylate polyol, polyisocyanate extended polybutadiene polyol, polyisocyanate extended polybutylene polyol and mixtures thereof.

The isocyanato-containing polymer intermediate is prepared from the reaction of a polyisocyanate with a polyol, including a polyester polyol, polyol derived from styrene/butadiene copolymer, polyether polyol, polycarbonate polyol, poly(meth)acrylate polyol, polyisoprene polyol, polybutadiene polyol or polybutylene polyol. The reaction of the polyol with an isocyanato-containing alkoxysilane or the reaction of the polyol with a polyisocyanate are carried out in the presence of at least one metal salt or metal complex, which is a urethane-forming catalyst. The urethane-forming catalyst increases the rates of reaction, thereby providing the benefits of shorter reaction times and lower reaction temperatures for the preparation of the alkoxysilyl-containing polymer or the intermediate polyisocyanate-extended polyols or polyisocyanate-containing polymers In the present invention, the urethane-forming catalysts is limited to organometallic catalysts. The amount of urethane-forming catalysts used in the preparation of the alkoxysilyl-containing polyurethane polymer composition is from about 1 to about 100 parts per million, preferably from about 5 to about 50 parts per million and most preferably from about 10 to about 25 parts per million, based on the weight of the metal added in the polyol. The stabilizing amount of the mercapto-containing compounds is dependent upon the amount of urethane-forming catalyst used, and is from about 4 to about 100 equivalents of mercapto (—SH) per one equivalent of metal in the catalyst, more preferable from about 8 to about 50 equivalents of mercapto (—SH) per one equivalent of metal and most preferably about 12 to about 25 equivalents of mercapto (—SH) per one equivalent of metal.

The alkoxysilyl-containing polyurethane polymer composition, which has been stabilized with the mercapto-compound, can be activated for moisture curing by the addition of a hydrolysis and condensation catalyst. The amount of hydrolysis and condensation catalysts added to the alkoxysilyl-containing polyurethane polymer composition is from about 0.02 to about 1.0 weight percent, preferably from about 0.05 to about 0.5 weight percent and still more preferably from about 0.1 to about 0.3 weight percent metal, based on weight of the alkoxysilyl-containing polyurethane polymer.

The alkoxysilyl-containing polyurethane polymer compositions may be combined with other components to form coatings, adhesives, sealant or other consumer or industrial goods.

DETAILED DESCRIPTION OF THE PREFERRED EMBODIMENTS

In the specification and claims herein, the following terms and expressions are to be understood as having the hereinafter indicated meanings.

The singular forms "a," "an" and "the" include the plural.

Other than in the working examples or where otherwise indicated, all numbers expressing amounts of materials, reaction conditions, time durations, quantified properties of materials, and so forth, stated in the specification and claims are to be understood as modified by the term "about".

All methods described herein may be performed in any suitable order unless otherwise indicated or otherwise clearly excluded by context. The use of any and all examples or exemplary language (e.g., "such as" or "include") provided herein is intended merely to better illuminate the invention and does not limit the scope of the invention unless such is clearly intended to be the case.

No language in the specification should be construed as indicating any non-claimed element as essential to the practice of the invention.

As used herein, the terms "comprising," "including," "containing," "characterized by" and terms of like import are to be understood as inclusive or open-ended and as not excluding additional, unrecited elements or method steps; additionally, such terms are to be understood as including the more restrictive terms "consisting of" and "consisting essentially of."

Composition percentages are given in weight percent unless otherwise indicated.

It will be understood that a particular numerical value includes at least that value unless the context clearly indicates otherwise and that any range of numerical values includes all sub-ranges of values within that range and any combination of the various endpoints of such ranges or sub-ranges.

It will be further understood herein that any compound, material or substance which is expressly or implicitly disclosed in the specification and/or recited in a claim as belonging to a group of structurally, compositionally and/or functionally related compounds, materials or substances includes individual representatives of the group and all combinations thereof.

The expression "alkoxysilyl-containing polyurethane polymer" shall be understood herein to apply to any polymer containing one or more terminal and/or pendant alkoxysilyl groups and at least one urethane (carbamate) functional groups, preferably at least two urethane (carbamate) functional groups.

The terms "silylation" and "silylated" shall be understood herein to apply to any of the conventional or otherwise known methods whereby an alkoxysilyl group is introduced into, or made part of, a silicone or non-silicone polymer thereby rendering the polymer moisture curable. As such, the term "silylation" and "silylated" are to be considered as inclusive of "hydrosilylation" and "hydrosilylated", respectively.

The term "organometallic compound" shall be understood herein to refer to a compound containing at least one metal atom and at least one carbon atom.

The term "metal complex" shall be understood herein to refer an organometallic compound formed by the combination of a metal with other organic compounds involving coordinate covalent bonds, and reconvertible to the original metal and original organic compound.

The term "metal salt" shall be understood herein to refer to an organometallic compound comprising a metal ion and at least one anion having at least one lone pair of electrons and at least one carbon atom, where the metal ion and anion are bonded together through an ionic bond.

The term "curing" shall be understood herein to refer to the sequence of chemical changes by which the alkoxysilyl group(s) of an alkoxysilyl-containing polymer in the presence of moisture first undergo hydrolysis to form hydrolyzed product (silanol-containing polymer) thereafter undergoing condensation with itself, with other hydrolyzed products and/or with unhydrolyzed alkoxysilyl-containing polymer.

The term "polymer" as used herein shall be understood to be synonymous with "resin" and vice versa.

The term "moisture" as it pertains to the hydrolysis of an alkoxysilyl-containing polymer shall be understood herein to include liquid water, steam and water vapor.

As used herein, the term "monovalent" in reference to a group means that the group is capable of forming one covalent bond per group and "divalent" means that the group is capable of forming two covalent bonds per group. As used herein, the term "polyvalent" in reference to a group means that the group is capable of forming two or more covalent bonds per group.

As used herein, the term "hydrocarbon group" is a group consisting of carbon and hydrogen atoms and includes acyclic hydrocarbon groups, alicyclic hydrocarbon groups and aromatic hydrocarbon groups.

The term "heteroatom" means an element selected from oxygen, nitrogen, silicon, sulfur, phosphorus, fluorine, chlorine, bromine and iodine.

As used herein, the term "acyclic hydrocarbon group" means any straight chain or branched hydrocarbon group, preferably containing from 1 to about 60 carbon atoms, which may be saturated or unsaturated. Suitable monovalent acyclic hydrocarbon groups include alkyl, alkenyl and alkynyl groups. Representative and non-limiting examples of acyclic hydrocarbon groups are methyl, ethyl, sec-butyl, tert-butyl, octyl, decyl, dodecyl, cetyl, stearyl, ethenyl, propenyl, and butynyl.

As used herein the term "alkyl" means any saturated straight or branched hydrocarbon group. In a preferred embodiment, monovalent alkyl groups are selected from linear or branched alkyl groups containing from 1 to about 60 carbons per group such as, e.g., methyl, ethyl, propyl, iso-propyl, n-butyl, iso-butyl, sec-butyl, tert-butyl, pentyl, hexyl, heptyl, decyl and dodecyl. The term "monovalent alkyl" group means any saturated hydrocarbon group having one open valence, as for example $—CH_2CH_2CH_3$. The term "divalent alkyl" refers to a saturated straight or branched hydrocarbon group having two open valences, as for example $—CH_2CH_2CH_2—$. The term "polyvalent alkyl" means any saturated straight or branched hydrocarbon group having two or more open valences, as for example $(—CH_2)_2CH—$, where the number of open valences is three.

As used herein the term "cycloalkyl" means any alicyclic hydrocarbon group which does not contain unsaturation.

As used herein the term "alkenyl" means any straight or branched monovalent hydrocarbon group containing at least one carbon-carbon double bond and preferably containing from 2 to about 10 carbon atoms such as, e.g., ethenyl, 2-propenyl, 3-butenyl, 5-hexenyl and 7-octenyl.

As used herein, the term "alicyclic hydrocarbon group" means a group containing one or more hydrocarbon rings, preferably containing from 3 to 12 carbon atoms, which may optionally be substituted on one or more of the rings with one or more monovalent or divalent acyclic group containing preferably 1 to about 6 carbon atoms. In the case of an alicyclic hydrocarbon group containing two or more rings, the rings may be fused rings in which the two rings share two or more carbon atoms in common, or rings that are bonded to each other through a covalent bond or divalent acyclic group. Suitable monovalent alicyclic hydrocarbon groups include, e.g., cycloalkyl groups such as cyclohexyl and cyclooctyl or cycloalkenyl groups such as cyclohexenyl. Suitable divalent hydrocarbon groups include, e.g., saturated or unsaturated divalent monocyclic hydrocarbon groups such as, e.g., 1,4-cyclohexyl, where the numbers, 1 and 4, denote where the open valences are located on the cyclohexyl group. Divalent alicyclic hydrocarbons may also be referred to 1,4-cyclohexylene group. Suitable trivalent alicyclic hydrocarbon groups include cycloalkanetriyl groups such as 1,2,6-cyclohexyl where the number represent the position of the open valences on the ring.

As used herein, the term "aromatic hydrocarbon group" means a hydrocarbon group containing one or more aromatic rings, which may optionally be substituted on the aromatic rings with one or more monovalent or divalent acyclic groups preferably containing from 1 to about 6 carbon atoms. In the case of an aromatic hydrocarbon group containing two or more rings, the rings may be fused rings in which the rings share two or more carbon atoms in common, or rings that are bonded to each other through a covalent bond or divalent acyclic group. Suitable monovalent aromatic hydrocarbon groups include, e.g., phenyl, tolyl, 2,4,6-trimethylphenyl, naphthyl and anthryl as well as aralkyl groups such as 2-phenylethyl.

The present invention involves the addition of a mercapto-containing compound to a alkoxysilyl-containing polyurethane polymer or urethane prepolymer that contains urethane-forming organometallic catalyst. The mercapto-containing compound renders the urethane forming organometallic catalyst remaining in the resulting polymer inactive or less active in its ability to catalyze the hydrolysis and/or condensation reactions alkoxysilyl groups with moisture. The inactive or less active catalyst allows for the alkoxysilyl-containing polyurethane polymer to be handle in environments that contain low levels of moisture without undergoing premature curing of the alkoxysilyl-containing polyurethane polymer, thereby making the alkoxysilyl-containing polyurethane polymer more stable. The addition of the mercapto-containing compound can result in better moisture stability of the composition containing the alkoxysilyl-containing polyurethane polymer and urethane-forming organometallic catalyst.

Accordingly, the addition of suitable mercapto-containing compounds, especially mercaptosilanes, preferably towards the end of the alkoxysilyl-containing polyurethane polymer synthesis method, can produce stabilized alkoxysilyl-containing polyurethane polymer compositions. The urethane-forming organometallic catalyst can be added to a mixture of polyols, polyisocyanate and/or silylating agents, thereby catalyzing urethane-forming reactions to form an alkoxysilyl-containing polyurethane polymer and/or urethane prepolymer, and the finished product exhibits effectively enhanced moisture stability after addition of the mercapto-containing compound. Thus, an alkoxysilyl-containing polyurethane polymer is prepared; a mercapto-containing compound, especially a mercaptosilane, is added to stabilize the composition from reactions with moisture, thereby avoiding premature cure during handling, processing of the composition and formulating coating, adhesives, sealants or other goods; and then a hydrolysis and condensation organometallic catalyst is added to the alkoxysilyl-containing polyurethane polymer composition to activate the moisture curing reactions.

The amount of the mercapto-containing compound, especially mercaptosilanes, can be small and still render the urethane-forming organometallic catalyst inactive or less active.

In an embodiment, the alkoxysilyl-containing polymer compositions of the present invention may be used in making moisture curable compositions such as moisture curable coatings, adhesives, sealants, consumer goods or industrial goods.

Preparation of Alkoxysilyl-Containing Polyurethane Polymer Composition

The alkoxysilyl-containing polyurethane polymer has the general chemical formula (I):

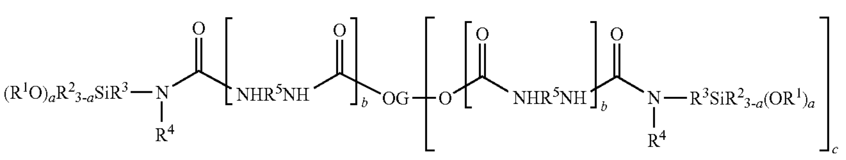

(I)

wherein each $R^1$ is independently a monovalent alkyl group of from 1 to 6 carbon atoms;

each $R^2$ is independently a monovalent alkyl group of from 1 to 4 carbon atoms or phenyl group;

each $R^3$ is independently a divalent alkyl group of from 1 to 12 carbon atoms;

each $R^4$ is independently a monovalent alkyl group of from 1 to 6 carbon atoms, phenyl group, hydrogen or $—R^3SiR^2_{3-a}(OR^1)_a$ group;

each $R^5$ is independently a divalent organic group selected from the group consisting of a divalent alkyl group having 1 to 16 carbon atoms, a divalent cycloalkyl group having 5 to 16 carbon atoms and the group $X^1$ having the general formula (II):

(II)

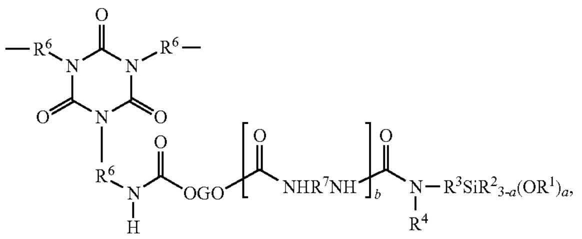

where each $R^6$ is independently an alkylene group of from 1 to 12 carbon atoms or a cycloalkylene group of from 5 to 16 carbon atoms and each $R^7$ is independently a divalent organic group selected from the group consisting of a divalent alkyl group having 1 to 16 carbon atoms and a divalent cycloalkyl group having 5 to 16 carbon atoms;

each G is a polyvalent organic group derived from a polyol or a monovalent organic group derived from a monol; and the subscripts a, b and c are integers wherein a is 1, 2 or 3, b is 0 or 1 and c is 0 to 5, with the proviso that if b is 0, then $R^4$ is hydrogen.

In one embodiment G is a polyvalent organic group derived from a polyol or monol and formed by removing the hydroxyl group of the polyol.

The polyol is selected from the group consisting of a polyester polyol, polyether polyol, polycarbonate polyol, polybutadiene polyol, polybutylene polyol, polyol derived from polystyrene/butadiene copolymer, polyisoprene polyol, poly(meth)acrylate polyol, polyisocyanate extended polyester polyol, polyisocyanate extended polyether polyols, polyisocyanate extended polycarbonate polyol, polyisocyanate extended polyol derived from polystyrene/butadiene copolymer, polyisocyanate extended polyisoprene polyol, polyisocyanate extended poly(meth)acrylate polyol, polyisocyanate extended polybutadiene polyol, polyisocyanate extended polybutylene polyol and mixtures thereof.

The polyisocyanate extended polyester polyol, polyisocyanate extended polyether polyols, polyisocyanate extended polycarbonate polyol, polyisocyanate extended polyol derived from polystyrene/butadiene copolymer, polyisocyanate extended polyisoprene polyol, polyisocyanate extended poly(meth)acrylate polyol, polyisocyanate extended polybutadiene polyol, polyisocyanate extended polybutylene polyol are hydroxyl-containing polyurethanes.

The hydroxyl-containing polyurethane polymer is prepared by reacting an excess of polyol with a polyisocyanate in the presence of a urethane-forming organometallic catalyst.

The alkoxysilyl-containing polyurethane polymer can be prepared by a batch process, a semi-continuous process or a continuous process.

In one embodiment, a polyol can be reacted with an isocyanate-containing alkoxysilane in the presence of a urethane-forming organometallic catalysts to produce an alkoxysilyl-containing polyurethane polymer composition, and subsequently, a mercapto-containing compound, especially an mercaptosilane, is added to the reaction product. The alkoxysilyl-containing polyurethane polymer has the general formula (I), in which b is 0.

In another embodiment, a polyol can be reacted with an excess of a polyisocyanate in the presence of an urethane-forming organometallic catalyst to form an isocyanate-containing prepolymer composition, which is reacted with an amine-containing alkoxysilane to produce an alkoxysilyl-containing polyurethane polymer composition. The mode of addition may include adding the amino-containing alkoxysilane to the polyisocyanate to form an isocyanate-containing alkoxysilane, which subsequently is reacted with a polyol, to add the amino-containing alkoxysilane during the reaction of polyisocyanate with the polyol, or to add the amino-containing alkoxysilane to the already formed isocyanate-containing prepolymer. The mercapto-containing compound, especially a mercaptosilane, is typically added after the urethane forming reactions are completed. The addition of the mercapto-containing compound may be to the isocyanato-containing prepolymer composition or to alkoxysilyl-containing polyurethane polymer composition. The alkoxysilyl-containing polyurethane polymer in this reaction sequence has the general formula (I), in which b is 1.

Hydroxyl-Containing Polyurethane and Isocyanate-Containing Polyurethane

Hydroxyl-containing polyurethanes and isocyanate-containing polyurethanes can be used to prepare the alkoxysilyl-containing polymer compositions. The hydroxyl-containing polyurethanes and isocyanato-containing urethanes are obtained by reacting at least one polyol as described above with at least one organic polyisocyanate in the presence of a catalytically effective amount of urethane-forming organometallic catalyst for the urethane-forming reaction, under urethane-forming reaction conditions such as any of those well known in the art.

Suitable organic polyisocyanates may be represented by the formula (III):

$$G^1(NCO)_z \qquad (III)$$

wherein z is 2 or 3, more specifically 2, or a blend of polyisocyanates having at least one diisocyanate of structure (III) where z is 2 and at least one triisocyanate of structure (III) where z is 3, and $G^1$ is a z-valent organic group, preferably a divalent or trivalent hydrocarbon group such as an aliphatic or cycloaliphatic group containing from 1 to 30 carbon atoms, preferably from 6 to 24 carbon atoms, or a divalent or trivalent organic group derived from a hydrocarbon and containing at least one isocyanurate ring, at least one urethane group and/or at least one oxygen atom. The polyisocyanate containing a hydrocarbon and at least one urethane group can be prepared from the reaction of a diisocyanate or triisocyanate with a trihydroxyalkane of from 3 to 10 carbon atoms.

Suitable organic polyisocyanates for use in preparing hydroxyl-terminated polyurethane and isocyanate-terminated polyurethane include, but are not limited to, diisocyanates, triisocyanates, dimers, trimers and mixtures thereof. Specific examples of useful polyisocyanates include, but are not limited to, hydrogenated 4,4'-diphenylmethane diisocyanate, hexamethylene diisocyanate, isophorone diisocyanate, 4,4'-dicyclohexylmethane diisocyanate, 1,3,6-hexamethylene triisocyanate, 1,6,11-undecane triisocyanate, isophorone diisocyanate dimer, isophorone diisocyanate trimer, reaction product of isophorone diisocyanate with a triol, and the like, and mixtures thereof. Isophorone diisocyanate its dimers and trimers and mixtures thereof are preferred for use herein.

In one embodiment, the organic polyisocyanate (III) is a mixture comprising an organic polyisocyanate containing two isocyanate groups and an organic polyisocyanate containing three isocyanate groups. The molar ratio of the organic polyisocyanate containing two isocyanate groups and organic polyisocyanate containing three isocyanate groups is from about 10:1 to about 1:10, preferably from about 2:1 to about 1:2, and more preferably about 1.5:1 to about 1:1.5.

The chain extension reaction can be carried out in various ways depending on the desired properties of the chain extended polyol. For example, polyisocyanates (III) are well suited as chain extension agents. In one embodiment, where it is desired to have at least one chain extended polyol, the at least one chain extended polyol can be produced by continuously mixing a molar excess of polyol with the polyisocyanate (III) to produce the hydroxyl-terminated polyurethane. A molar excess of polyol in the chain extension reaction produces an OH:NCO molar ratio greater than about 1:1. In more specific embodiments the OH:NCO molar ratio ranges from about 1.1:1 to about 10:1, even more specifically, from about 1.5:1 to about 3:1, and even more specifically from about 1.8:1 to about 2.2:1 to provide hydroxyl-terminated polyurethane.

In one embodiment, where it is desired to have an isocyanate-containing polyurethane prepolymer where the reactive functional groups are isocyanate groups, the isocyanate-containing polyurethane prepolymer can be produced by continuously mixing a molar excess of polyisocyanate (III) with the polyol to provide isocyanate-containing polyurethane prepolymer. A molar excess of polyisocyanate (III) in the urethane forming reaction produces an OH:NCO molar ratio less than about 1:1. In more specific embodiments the OH:NCO molar ratio ranges from about 0.1:1 to about 0.9:1, even more specifically, from about 0.3:1 to about 0.7:1, and even move specifically from about 0.45:1 to about 0.55:1 to provide isocyanate-terminated polyurethane prepolymer.

Conditions for the polyurethane-forming reaction can include reaction temperatures of from about 20 to about 180° C. and preferably from about 60 to about 130° C., pressures of from about 10 to about 300 kilopascal, preferably from about 50 to about 150 kilopascal and more preferably about 100 kilopascal, and reactions times of from about 0.50 to about 24 hours and preferably from about 2 to about 8 hours. The chain extension reaction can be carried out in the presence of urethane-forming organometallic catalysts used for the urethane-forming reaction.

Known and conventional urethane-forming organometallic catalysts for the urethane-forming reaction are contemplated. Suitable urethane-forming catalysts include organometallic salts or organometallic complexes. Examples of the metal portion of urethane forming organometallic catalysts useful in the present invention include tin, zirconium, iron, cobalt, manganese, nickel, bismuth and zinc, more preferably tin, bismuth and zinc, and even more preferably tin. The urethane-forming organometallic catalysts include metal complexes, such as chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylacetone-alkylenediimines, salicylaldehydeimine, and the like, with the various metals such as Sn, Zr, Fe, Co, Mn, Ni, Bi and Zn; and organometallic salts, such as alcoholates and phenolates of various metals such as $Zr(OR_8)_2$, $Sn(OR_8)_4$, $Sn(OR_8)_2$, $Bi(OR_8)_3$ and the like, wherein $R^8$ is monovalent alkyl or aryl of from 1 to 18 carbon atoms, or carboxylates of various metals, such as $Zr(O(C{=}O)R^8)_2$, $Sn(O(C{=}O)R^8)$, $Sn(O(C{=}O)R^8)_2$, $Bi(O(C{=}O)R^8)_3$, $R^9{}_2Sn(O(C{=}O)R^8)_2$, where $R^8$ is monovalent alkyl or aryl of from 1 to 18 carbon atoms and $R^9$ is monovalent alkyl or aryl of from 1 to 18 carbon atoms; and reaction products of alcoholates of various metals with carboxylic acids, beta-diketones, and 2-(N,N-dialkylamino)alkanols.

In one specific embodiment organotin compounds that are dialkyltin salts of carboxylic acids, can include the non-limiting examples of dibutyltin diacetate, dibutyltin dilaurate, dibutyltin maleate, dilauryltin diacetate, dioctyltin diacetate, dibutyltin-bis(4-methylaminobenzoate), dibutyltin-bis(6-methylaminocaproate), and the like, and combinations thereof.

Similarly, in another specific embodiment there may be used trialkyltin hydroxide, dialkyltin oxide, dialkyltin dialkoxide, or dialkyltin dichloride and combinations thereof. Non-limiting examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-dimethylaminopentylate), dibutyltin dichloride, dioctyltin dichloride, and the like, and combinations thereof.

The amount of urethane-forming catalysts used in the preparation of the alkoxysilyl-containing polyurethane polymer composition is from about 1 to about 100 parts per million, preferably from about 5 to about 50 parts per million and most preferably from about 10 to about 25 parts per million, based on the weight of the metal added in the polyol.

Silylation Reaction to Form Alkoxysilyl-Containing Polyurethane Polymers

In one embodiment, the alkoxysilyl-containing polyurethane polymer can be prepared from the reaction of a polyol with an isocyanato-containing alkoxysilane in the presence of a urethane-forming organometallic catalyst. The polyol includes polyisocyanate extended polyol, also referred to as a hydroxyl-containing polyurethane. The polyol is a compound having the general formula (IV):

$$G(O{-}H)_{c+1} \quad (IV)$$

wherein G is an organic group and the subscript c is an integer of from 0 to 5, preferably 1, 2 or 3. The organic group G is derivable from polyester polymer, polyether polymer, polycarbonate polymer, polybutadiene polymer, polybutylenepolymer, polystyrene/butadiene copolymer, polyisoprene polymer, poly(meth)acrylate polymer, polyisocyanate extended polyester polymer, polyisocyanate extended polyether polymer, polyisocyanate extended polycarbonate polymer, polyisocyanate extended polystyrene/butadiene copolymer, polyisocyanate extended polyisoprene polymer, polyisocyanate extended poly(meth)acrylate polymer, polyisocyanate extended polybutadiene polymer, polyisocyanate extended polybutylene polymer and mixtures thereof.

The polyol is selected from the group consisting of a polyester polyol, polyether polyol, polycarbonate polyol, polybutadiene polyol, polybutylene polyol, polyol derived from polystyrene/butadiene copolymer, polyisoprene polyol, poly(meth)acrylate polyol, polyisocyanate extended polyester polyol, polyisocyanate extended polyether polyols, polyisocyanate extended polycarbonate polyol, polyisocyanate extended polyol derived from polystyrene/butadiene copolymer, polyisocyanate extended polyisoprene polyol, polyisocyanate extended poly(meth)acrylate polyol, polyisocyanate extended polybutadiene polyol, polyisocyanate extended polybutylene polyol and mixtures thereof.

Isocyanato-containing alkoxysilanes that are useful for silylating the polyols have general formula (V):

$$O{=}C{=}N{-}R^3{-}SiR^2{}_{(3-a)}(OR^1)_a \quad (V)$$

wherein:

each $R^1$ is independently a monovalent alkyl group of from 1 to 6 carbon atoms;

each $R^2$ is independently a monovalent alkyl group of from 1 to 4 carbon atoms or phenyl group;

each $R^3$ is independently a divalent alkyl group of from 1 to 12 carbon atoms; and the subscript a is an integer wherein a is 1, 2 or 3.

In one embodiment, $R^3$ is $-(CH_2)_n-$, where n is 1, 2 or 3, each $R^1$ is independently methyl, ethyl, propyl or isopropyl and a is 3.

Specific isocyanato-containing alkoxysilanes (V) that can be used herein to react with the aforementioned polyols and hydroxyl-containing polyurethanes to provide alkoxysilyl-containing polyurethane polymer (I) include isocyanatomethyltrimethoxysilane, 3-isocyanatopropyltrimethoxysilane, isocyanatoisopropyltrimethoxysilane, 4-isocyanato-n-butyltrimethoxysilane, isocyanato-t-butyltrimethoxysilane, isocyanatomethylmethyldimethoxysilane, 3-isocyanatopropylmethyldimethoxysilane, 3-isocyanatopropyltriethoxysilane, isocyanatoisopropyltriethoxysilane, 4-isocyanato-n-butyltriethoxysilane, isocyanato-t-butyltriethoxysilane, and the like.

The urethane-forming organometallic catalysts that are useful for the silylation of the aforementioned polyols, including hydroxyl-containing polyurethanes, include those indicated above to be suitable for use in the preparation of the hydroxyl-containing polyurethanes.

Known and conventional urethane-forming organometallic catalysts for the urethane-forming reaction are contemplated. Suitable urethane-forming catalysts include organometallic salts or organometallic complexes. Examples of the metal portion of urethane forming organometallic catalysts useful in the present invention include tin, zirconium, iron, cobalt, manganese, nickel, bismuth and zinc, more preferably tin, bismuth and zinc, and even more preferably tin. The urethane-forming organometallic catalysts include metal complexes, such as chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylaceone-alkylenediimines, salicylaldehydeimine, and the like, with the various metals such as Sn, Zr, Fe, Co, Mn, Ni, Bi and Zn; and organometallic salts, such as alcoholates and phenolates of various metals such as $Zr(OR^7)_2$, $Sn(OR^7)_4$, $Sn(OR^7)_2$, $Bi(OR^7)_3$ and the like, wherein $R^7$ is monovalent alkyl or aryl of from 1 to 18 carbon atoms, or carboxylates of various metals, such as $Zr(O(C{=}O)R^7)_2$, $Sn(O(C{=}O)R^7)_4$, $Sn(O(C{=}O)R^7)_2$, $Bi(O(C{=}O)R^7)_3$, $R^8{}_2Sn(O(C{=}O)R^7)_2$, where $R^8$ is monovalent alkyl or aryl of from 1 to 18 carbon atoms; and reaction products of alcoholates of various metals with carboxylic acids, beta-diketones, and 2-(N,N-dialkylamino)alkanols.

In one specific embodiment organotin compounds that are dialkyltin salts of carboxylic acids, can include the non-limiting examples of dibutyltin diacetate, dibutyltin dilaurate, dibutyltin maleate, dilauryltin diacetate, dioctyltin diacetate, dibutyltin-bis(4-methylaminobenzoate), dibutyltin-bis(6-methylaminocaproate), and the like, and combinations thereof.

Similarly, in another specific embodiment there may be used trialkyltin hydroxide, dialkyltin oxide, dialkyltin dialkoxide, or dialkyltin dichloride and combinations thereof. Non-limiting examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-dimethylaminopentylate), dibutyltin dichloride, dioctyltin dichloride, and the like, and combinations thereof.

The amount of urethane-forming catalysts used in the preparation of the alkoxysilyl-containing polyurethane polymer composition is from about 1 to about 100 parts per million, preferably from about 5 to about 50 parts per million and most preferably from about 10 to about 25 parts per million, based on the weight of the metal added in the polyol.

The isocyanato-containing alkoxysilane that are used in the silylation reaction can be used in a slight molar excess or a slight molar deficiency of the hydroxyl equivalents of the polyols (OH groups) with respect to the isocyanate equivalents of the isocyanatosilane (NCO groups). Advantageously, the molar ratio of NCO to OH is from about 0.7 to about 1.5, more preferably from about 0.9 to about 1.1 and more specifically still from about 0.98 to about 1.02.

Particularly useful alkoxysilyl-containing polyurethane polymers having formula (I) are prepared from polypropylene diols, aliphatic diisocyanates and 3-isocyanatopropyltrialkoxysilanes. The polypropylene diols advantageously have levels of terminal ethylenic unsaturation of less than about 0.02, and more advantageously less than about 0.008, milliequivalents per gram (meq/g) of polyol, and number average molecular weights as determined by hydroxyl end-group analysis of from about 5,000 to about 15,000 grams per mole. The molar ratio of isocyanate of the isocyanatosilane (NCO) to the hydroxyl of the hydroxyl-terminated polyurethane resin can range from about 0.9 to about 1.05 and more particularly from about 1.0 to about 1.5.

Conditions for the silylation reaction can include reaction temperatures of from about 20 to about 180° C. and preferably from about 60 to about 130° C., pressures of from about 10 to about 300 kilopascal, preferably from about 50 to about 150 kilopascal and more preferably about 100 kilopascal, and reactions times of from about 0.50 to about 24 hours and preferably from about 2 to about 8 hours.

The silylation of the polyol is complete when no hydroxyl groups be present following silylation when an excess of isocyanato-containing alkoxysilane is used or that no isocyanate groups be present following silylation when an excess of polyol is used. The silylation reaction is substantially complete when an excess of polyol is used, when more than about 90 mole percent, preferably more than about 95 mole percent, most preferably greater than about 98 mole percent of the isocyanato-containing alkoxysilane has reacted with the hydroxyl group of the polyol. The silylation reaction is substantially complete when an excess of isocyanato-containing silane is used, is when more than about 80 mole percent, preferably more than about 90 mole percent, most preferably greater than about 95 mole percent of the isocyanato-containing alkoxysilane has reacted with the hydroxyl groups of the polyol. The amount of residual isocyanato-containing silane is determined by measuring the amount of isocyanate group. ASTM D2572-97(2010), Standard Test Method for Isocyanate Groups in Urethane Materials or Prepolymers, can be used to determine the amount of isocyanate groups.

In another embodiment, the alkoxysilyl-containing polyurethane polymer can be prepared from the reaction of an isocyanato-containing polyurethane prepolymer with an amino-containing alkoxysilane in the presence or absence of a urethane-forming organometallic catalyst. The urethane-forming organometallic catalyst is not required for these silylation reactions because the reaction proceed at sufficient rates in the absence of the urethane-forming organometallic catalyst. However, the urethane-forming organometallic catalyst is present from the preparation of the isocyanato-containing polyurethane prepolymer and does not need to be removed prior to the silylation reaction.

The isocyanato-containing polyurethane prepolymer, which may include chain extended isocyanato-containing polyurethane prepolymer in which two or more polyols react with a polyisocyanate to form hydroxyl-containing polyurethane and subsequently reacts with more polyisocyanate. The isocyanato-containing polyurethane prepolymer is a compound having the general formula (VI):

$$G[O—(C{=}O)NHR^{10}N{=}C{=}O]_{c+1} \quad (VI)$$

wherein

- G is a polyvalent organic group derived from a polyol or a monovalent organic group derived from a monol;
- each $R^{10}$ is independently a divalent organic group selected from the group consisting of a divalent alkyl group having 1 to 16 carbon atoms, a divalent cycloalkyl group having 5 to 16 carbon atoms and the group $X^2$ having the general formula (VII):

(VII)

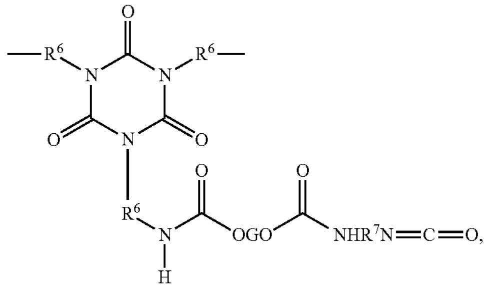

where each $R^6$ is independently an alkylene group of from 1 to 12 carbon atoms or a cycloalkylene group of from 5 to 16 carbon atoms; each $R^7$ is independently a divalent organic group selected from the group consisting of a divalent alkyl group having 1 to 16 carbon atoms and a divalent cycloalkyl group having 5 to 16 carbon atoms; and the subscript c is an integer wherein c is 0 to 5, preferably 1, 2 or 3.

The organic group G is derivable from polyol in which the hydroxyl groups have been removed. The polyol is selected from the group consisting of a polyester polyol, polyether polyol, polycarbonate polyol, polybutadiene polyol, polybutylene polyol, polyol derived from polystyrene/butadiene copolymer, polyisoprene polyol, poly(meth)acrylate polyol, polyisocyanate extended polyester polyol, polyisocyanate extended polyether polyols, polyisocyanate extended polycarbonate polyol, polyisocyanate extended polyol derived from polystyrene/butadiene copolymer, polyisocyanate extended polyisoprene polyol, polyisocyanate extended poly(meth)acrylate polyol, polyisocyanate extended polybutadiene polyol, polyisocyanate extended polybutylene polyol and mixtures thereof.

Amino-containing alkoxysilanes that are useful for silylating the polyols have general formula (VIII):

$$HN(R^4)—R^3—SiR^2_{(3-a)}(OR^1)_a \quad (VIII)$$

wherein:

- each $R^1$ is independently a monovalent alkyl group of from 1 to 6 carbon atoms;
- each $R^2$ is independently a monovalent alkyl group of from 1 to 4 carbon atoms or phenyl group;
- each $R^3$ is independently a divalent alkyl group of from 1 to 12 carbon atoms;
- each $R^4$ is independently a monovalent alkyl group of from 1 to 6 carbon atoms, phenyl group, hydrogen or $—R^3SiR^2_{3-a}(OR^1)_a$ group; and the subscript a is an integer wherein a is 1, 2 or 3.

In one embodiment, $R^3$ is $—(CH_2)_n—$, where n is 1, 2 or 3, each $R^1$ is independently methyl, ethyl, propyl or isopropyl and a is 3.

Specific amino-containing alkoxysilanes (VIII) that can be used herein to react with the aforementioned isocyanato-containing polyurethanes prepolymers to provide alkoxysilyl-containing polyurethane polymer (I) include amino-containing alkoxysilanes such as 3-aminopropyltrimethoxysilane, 3-aminopropyltriethoxysilane, 4-aminobutyltriethoxy-silane, N-methyl-3-amino-2-methylpropyltrimethoxysilane, N-ethyl-3-amino-2-methylpropyltrimethoxysilane, N-ethyl-3-amino-2-methylpropyldiethoxymethylsilane, N-ethyl-3-amino-2-methylpropyltriethoxysilane, N-ethyl-3-amino-2-methylpropyl-methyldimethoxysilane, N-butyl-3-amino-2-methylpropyltrimethoxysilane, 3-(N-methyl-2-amino-1-methyl-1-ethoxy)-propyltrimethoxysilane, N-ethyl-4-amino-3,3-dimethyl-butyldimethoxymethylsilane, N-ethyl-4-amino-3,3-dimethylbutyltrimethoxy-silane, N-(cyclohexyl)-3-aminopropyltrimethoxysilane, N-(2-aminoethyl)-3-aminopropyltri-methoxysilane, N-(2-aminoethyl)-3-aminopropyltriethoxy-silane, N-(2-aminoethyl)-3-aminopropylmethyldimethoxysilane, aminopropyltriethoxysilane, bis-(3-trimethoxysilyl-2-methylpropyl)amine, N-(3'-trimethoxysilylpropyl)-3-amino-2-methylpropyltri-methoxysilane or combinations thereof.

The amino-containing alkoxysilane that are used in the silylation reaction can be used in a slight molar excess or a slight molar deficiency of the isocyanate equivalents of the isocyanato-containing polyurethane prepolymer (NCO groups) with respect to the amino equivalents of the amino-containing alkoxysilane (NH groups). Advantageously, the molar ratio of NH to NCO is from about 0.7 to about 1.5, more preferably from about 0.9 to about 1.1 and more specifically still from about 0.98 to about 1.02.

Particularly useful alkoxysilyl-containing polyurethane polymers having formula (I) are prepared from polypropylene diols, aliphatic diisocyanates and secondary amino-containing trialkoxysilanes. The polypropylene diols advantageously have levels of terminal ethylenic unsaturation of less than about 0.02, and more advantageously less than about 0.008, milliequivalents per gram (meq/g) of polyol, and number average molecular weights as determined by hydroxyl end-group analysis of from about 5,000 to about 15,000 grams per mole. The molar ratio of amino group of the amino-containing alkoxysilane (NH) to the isocyanate groups (NCO) of the isocyanato-containing polyurethane prepolymer can range from about 0.9 to about 1.05 and more particularly from about 0.98 to about 1.02.

Conditions for the silylation reaction can include reaction temperatures of from about 20 to about 180° C. and preferably from about 60 to about 130° C., pressures of from about 10 to about 300 kilopascal, preferably from about 50 to about 150 kilopascal and more preferably about 100 kilopascal, and reactions times of from about 0.50 to about 24 hours and preferably from about 2 to about 8 hours.

The silylation of the isocyanato-containing polyurethane prepolymer is complete when no isocyanate groups are present following silylation when an excess of amino-containing alkoxysilane is used or that no amino groups be present following silylation when an excess of isocyanato-containing polyurethane prepolymer is used. The silylation reaction is substantially complete when an excess of isocyanato-containing polyurethane prepolymer is used, when more than about 90 mole percent, preferably more than about 95 mole percent, most preferably greater than about 98 mole percent of the amino-containing alkoxysilane has reacted with the isocyanate group of the isocyanato-containing polyurethane prepolymer. The silylation reaction is substantially complete when an excess of amino-containing silane is used, is when more than about 80 mole percent, preferably more than about 90 mole percent, most preferably greater than about 95 mole percent of the amino-containing alkoxysilane has reacted with the isocyanate groups of the isocyanato-containing polyurethane prepolymer. The amount of residual isocyanato-containing polyurethane prepolymer is determined by measuring the amount of isocyanate group. ASTM D2572-97(2010), Standard Test Method for Isocyanate Groups in Urethane Materials or Prepolymers, can be used to determine the amount of isocyanate groups.

In the production of alkoxysilyl-containing polyurethane polymer composition, residual isocyanate may remain in the composition, due to an imbalance in the silylating agent or incomplete reaction. The residual isocyanate can be removed from the composition by reacting the isocyanate groups with a reactive hydrogen quenching agent, such as for example a monol, a secondary amine, or lactam. The quenching reaction is preferably carried out in the presence of a urethane-forming organometallic catalyst.

An mercapto-containing compound is added to the alkoxysilyl-containing polyurethane polymer composition to form a moisture stable alkoxysilyl-containing polyurethane polymer composition. The moisture stable alkoxysilyl-containing polyurethane polymer composition may be removed from the reaction equipment for storage or further incorporation into a coating, adhesive, sealant or other consumer or industrial good product.

While the process for making the moisture stable alkoxysilyl-containing polyurethane polymer compositions may be a batch, semi-continuous or continuous process, it is preferred that the process is a continuous process. Advantages of a continuous process include, for example, the ease in application to high volume production and scale-up operations. Moreover, the efficiency of the process can be improved. In a continuous process, reaction chambers may be provided for chain extension reactions of the polyol with polyisocyanates, if necessary and for the silylation step.

Mercapto-Containing Compounds as Stabilizers

A mercapto-containing compound, which can render the urethane-forming organometallic catalyst inactive or less active catalyst to catalyzing hydrolysis and condensation reactions of alkoxysilyl groups in the alkoxysilyl-containing polyurethane polymer composition. The mercapto-containing compound can have the general formula (IX):

$$(HS)_oR^1X^2_p \quad (IX)$$

wherein:

each $R^{11}$ is independently a divalent or polyvalent hydrocarbon containing 1 to 20 carbon atoms or a divalent or polyvalent hydrocarbon containing 1 to 20 carbon atoms and at least one oxygen atom;

each $X^2$ is independently a functional group selected from the group consisting of hydroxyl (—OH), carboxyl (—C(=O)OH), ester (—C(=O)OR$^{17}$, where $R^{17}$ is a divalent alkyl group of from 1 to 10 carbon atoms or a divalent alkyl group of from 1 to 10 carbon atom and substituted with at least one hydroxyl group), carboxylate salt (—C(=O)O$^-$HN$^+$(R$^2$)(R$^{13}$)$_2$, where $R^{12}$ is a chemical bond to $R^{11}$, hydrogen or a monovalent hydrocarbon group of from 1 to 12 carbon atoms, and each $R^{13}$ is independently a hydrogen or a monovalent hydrocarbon group of from of from 1 to 12 carbon atoms), amino —NR$^{13}_2$, where each $R^{13}$ is independently a hydrogen, a hydrocarbon group of from of from 1 to 12 carbon atoms, and an alkoxysilyl group (—Si(OR$^{14}$)$_e$(R$^{15}$)$_{3-e}$ where each $R^{14}$ is independently a monovalent alkyl group of from 1 to 10 carbon atoms, a monovalent alkyl group of from 1 to 10 carbon atom and substituted with at least one hydroxyl group, a monovalent alkyl group of containing from 3 to 30 carbon atoms and at least one oxygen atom, or a —R$^{16}$[Si(R$^{11}$(SH)$_o$)(OR$^{17}$)$_f$(R$^{15}$)$_{1-f}$]$_q$OR$^{18}$ group wherein each $R^{15}$ is independently methyl or phenyl, each $R^{16}$ is independently a divalent alkyl group of from 1 to 10 carbon atoms or a divalent alkyl group of from 1 to 10 carbon atom and substituted with at least one hydroxyl group; each $R^{17}$ is independently a divalent alkyl group of from 1 to 10 carbon atoms or a divalent alkyl group of from 1 to 10 carbon atom and substituted with at least one hydroxyl group, each $R^{18}$ is independently a divalent alkyl group of from 1 to 10 carbon atoms or a divalent alkyl group of from 1 to 10 carbon atom and substituted with at least one hydroxyl group and the subscripts f and q are integers where f is 0 or 1, and q is 1 to about 5, with the provisos that (i) when $R^{13}$ is a monovalent hydrocarbon group of from 1 to 12 carbon atoms, then two $R^{13}$ groups may be bonded together through a covalent bond to generate a divalent group —R$^{13}$—R$^{13}$— which forms a ring containing the nitrogen atom;

(ii) when f is 1, then $R^{17}$ and $R^{18}$ may be bonded together by a covalent bond to form a divalent group —R$^{17}$—R$^{18}$—, which forms a ring containing the silicon atom and two oxygen atoms; and (iii) when $R^{14}$ is an alkyl group of 1 to 10 carbon atoms and e is 2 or 3, then two $R^{14}$ groups can be bonded together through a covalent bond to from a divalent —R$^{14}$—R$^{14}$— group, which forms a ring containing a silicon atom and two oxygen atoms; and the subscripts o and p are integers where o is 1, 2 or 3 and p is 0, 1 or 2.

In one embodiment, $R^{11}$ is a divalent alkyl group of from 1 to 20 carbons, $X^2$ is —OH, —C(=O)OR$^{17}$, where $R^{17}$ is independently a divalent alkyl group of from 1 to 10 carbon atoms or a divalent alkyl group of from 1 to 10 carbon atom and substituted with at least one hydroxyl group, or C(=O)OH, and o is 1 and p is 1.

In another embodiment, $R^{11}$ is a divalent alkyl group of from 1 to 20 carbon atoms, $X^2$ is Si(OR$^{14}$)$_e$(R$^{15}$)$_{3-e}$, where each $R^{14}$ is independently a monovalent alkyl group of from 1 to 6 carbon atoms, a monovalent alkyl group of from 1 to 6 carbon atoms and substituted with one hydroxyl group or a monovalent alkyl group containing from 3 to 30 carbon atoms and from 1 to 13 oxygen atoms, with the proviso that the oxygen atoms are separated from each other by at least two carbon atoms, $R^{15}$ is methyl, e is 2 or 3, o is 1 and p is 1.

In still another embodiment, $R^{11}$ is a divalent alkyl group of from 1 to 20 carbon atoms, $X^2$ is Si(OR$^{14}$)$_e$(R$^5$)$_{3-e}$, where each $R^{14}$ is a monovalent alkyl group of from 1 to 10 carbon atom and substituted with one hydroxyl group or where one $R^{14}$ is each $R^{14}$ is a monovalent alkyl group of from 1 to 10 carbon atom and substituted with one hydroxyl group, and the other two $R^{14}$ groups are monovalent alkyl groups of from 1 to 10 carbon atoms which are bonded together through a covalent bond to generate a divalent group —$R^{14}$—$R^{14}$—, which forms a ring containing a silicon atom and two oxygen atoms, e is 3, o is 1 and p is 1.

In yet another embodiment, $R^{11}$ is a divalent alkyl group of from 1 to 20 carbon atoms, $X^2$ is $Si(OR^{14})_e(R^5)_{3-e}$, where each $R^{14}$ is a monovalent alkyl group of from 1 to 10 carbon atom and substituted with one hydroxyl group or a —$R^{16}O[Si(R^{11}(SH)_o)(OR^{17})_f(R^{15})_{1-f}]_qOR^{18}$ group wherein each $R^{15}$ is methyl, each $R^{16}$ is independently a divalent alkyl group of from 1 to 10 carbon atoms; each $R^{17}$ is independently a divalent alkyl group of from 1 to 10 carbon atoms or a divalent alkyl group of from 1 to 10 carbon atom and substituted with at least one hydroxyl group, each $R^{18}$ is independently a divalent alkyl group of from 1 to 10 carbon atoms or a divalent alkyl group of from 1 to 10 carbon atom and substituted with at least one hydroxyl group and the subscripts e, f and q are integers where e is 2 or 3, f is 0 or 1, and q is 1 to about 5, with the proviso that when f is 1, then $R^{17}$ and $R^{18}$ may be bonded together by a covalent bond to form a divalent group —$R^{17}$—$R^{18}$— which forms a ring containing the silicon atom and two oxygen atoms.

Representative and non-limiting specific examples of mercapto-containing compounds include 1-mercaptododecane, 1-mercapto-2-hydroxyethane, 1-mercapto-3-hydroxypropane, 2-mercaptoacetic acid, methyl 3-mercaptopropropanoic acid, cysteine, 2-mercaptoethyl trimethoxysilane, 3-mercaptopropyl trimethoxysilane, 2-mercaptopropyl triethoxysilane, 3-mercaptopropyl triethoxysilane, 2-mercaptoethyl tripropoxysilane, 2-mercaptoethyl tri sec-butoxysilane, 3-mercaptopropyl tri-t-butoxysilane, 3-mercaptopropyl triisopropoxysilane, 2-mercaptoethyl dimethoxy ethoxysilane, 3-mercaptopropyl methoxyethoxypropoxysilane, 3-mercaptopropyl dimethoxy methylsilane, 3-mercaptopropyl methoxy dimethylsilane, 3-mercaptopropyl ethoxy dimethylsilane, 3-mercaptopropyl diethoxy methylsilane, 3-mercaptopropyl cyclohexoxy dimethyl silane, 4-mercaptobutyl trimethoxysilane, 3-mercapto-3-methylpropyltrimethoxysilane, 3-mercapto-3-methylpropyl-tripropoxysilane, 3-mercapto-3-ethylpropyl-dimethoxy methylsilane, 3-mercapto-2-methylpropyl trimethoxysilane, 3-mercapto-2-methylpropyl dimethoxy phenylsilane, 3-mercaptocyclohexyl-trimethoxysilane, 12-mercaptododecyl trimethoxy silane, 12-mercaptododecyl triethoxy silane, 2-mercapto-2-methylethyl-tripropoxysilane, 2-mercaptophenyl trimethoxysilane, 2-mercaptophenyl triethoxysilane, 2-mercaptotolyl trimethoxysilane, 2-mercaptotolyl triethoxysilane, 1-mercaptomethyltolyltrimethoxysilane, 1-mercaptomethyltolyl triethoxysilane, 2-mercaptoethylphenyl trimethoxysilane, 2-mercaptoethylphenyl triethoxysilane, 2-mercaptoethyltolyl trimethoxysilane, 2-mercaptoethyltolyl triethoxysilane, 3-mercaptopropylphenyl trimethoxysilane, 3-mercaptopropylphenyl triethoxysilane; 3-(2-{3-[2-(3-mercapto-propyl)-5-methyl-[1,3,2]dioxasilinan-2-yloxy]-2-methyl-propoxy}-5-methyl-[1,3,2]dioxasilinan-2-yl)-propane-1-thiol; 3-(2-{3-[2-(3-mercapto-propy)-4,4,6-trimethyl-[1,3,2]dioxasilinan-2-yloxy]-2-methyl-propoxy}-4,4,6-trimethyl-[1,3,2]dioxasilinan-2-yl)-propane-thiol; 3-(2-{3-[2-(3-mercapto-propyl)-4,4,6-trimethyl-[1,3,2]dioxasilinan-2-yloxy]-1,1-dimethyl-butoxy}-4,4,6-trimethyl-[1,3,2]dioxasilinan-2-yl)-propane-1-thiol; 3-({3-[2-mercapto-propyl)-5-methyl-[1,3,2]dioxasilinan-yloxy]-2-methyl-propoxy}-bis-[3-hydroxy-2-methyl-propoxy]-silanyl)-propane-1-thiol; 3-[{3-[{3-bis-(3-hydroxy-2-methyl-propyl)-(3-mercapto-propyl)-silanyloxy]-1-methyl-propoxy}-(3-hydroxy-2-methyl-propoxy)-(3-mercapto-propyl)-silanyloxy]-2-methyl-propan-1-ol; 3-[[3-((3-hydroxy-3-methyl-propoxy)-3-mercapto-propyl)-{3-[2-(3-mercapto-propyl)-5-methyl-[1,3,2]dioxasilinan-2-yloxy]-1-methyl-propoxy}-silanyloxy)-2-methyl-propoxy-(3-hydroxy-2-methyl-propoxy)-3-mercapto-propyl)-silanyl]-2-methylpropan-1-ol; 3-(2-{3-[2-(3-mercapato-butyl)-[1,3,2]dioxasilinan-2-yloxy]-propoxy}-[1,3,2]dioxasilinan-2-yl)-butane-1-thiol; 3-(2-{3-[2-(3-mercapto-phenyl)-4,4,6-trimethyl-[1,3,2]dioxasilinan-2-yloxy]-2-methyl-propoxy}-4,4,6-trimethyl-[1,3,2]dioxasilinan-2-yl)-3-benzene-thiol; 3-(2-{3-[2-(3-mercapto-cyclohexyl)-4,4,6-trimethyl-[1,3,2]dioxasilinan-2-yloxy]-1,1-dimethyl-butoxy}-4,4,6-trimethyl-[1,3,2]dioxasilinan-2-yl)-cyclohexane-1-thiol; 3-({3-[2-mercapto-methyl)-5-methyl-[1,3,2]dioxasilinan-2-yloxy]-2-methyl-propoxy}-diethoxy]-silanyl)-methane-1-thiol; 3-[{3-[{3-bis-(3-hydroxy-2,2-dimethyl-propyl)-(3-mercapto-propyl)-silanyloxy]-2,2-dimethyl-propoxy}-(3-hydroxy-2,2-dimethyl-propoxy)-(3-mercapto-propyl)-silanyloxy]-2,2-dimethyl-propan-1-ol; 3-[[3-((3-hydroxy-3-phenyl-propoxy)-3-mercapto-propyl)-{3-[2-(3-mercapto-propyl)-5-phenyl-[1,3,2]dioxasilinan-2-yloxy]-2-phenyl-1-propoxy}-silanyloxy)-2-phenyl-propoxy-(3-hydroxy-2-phenyl-propoxy)-3-mercapto-propyl)-silanyl]-2-phenylpropan-1-ol; 3-[{3-[(methyl)-(3-hydroxy-2-methyl-propoxy)-(3-mercapto-propyl)-silanyloxy]-2-methyl-propoxy}-methyl)-(3-mercapto-propyl)-silanyloxy]-2-methyl-propan-1-ol, and combinations thereof.

In one embodiment, stabilizing amount of the mercapto-containing compounds is dependent upon the amount of urethane-forming catalyst used, and is from 4 to 100 equivalents of mercapto (—SH) per one equivalent of metal in the catalyst, more preferable from 8 to 50 equivalents of mercapto (—SH) per one equivalent of metal and most preferably 12 to 25 equivalents of mercapto (—SH) per one equivalent of metal.

In one embodiment, the amount of metal in the urethane-forming organometallic catalysts can be determined using inductively coupled plasma (ICP) methods (EPA/SW-846 methods 3015/3050B.6010B), dated Mar. 17, 2006, which can be obtain at: https://clu-in.org/download/ert/1811-r30.pdf In one embodiment, the amount of —SH in the mercapto-containing compounds can be determined by titration with silver nitrate solutions. The method is outline in ASTM D3227-16 Standard Method for (Thiol Mercaptan) Sulfur in Gasoline, Kerosene, Aviation Turbine and Distillate Fuels (Potentiometric Method).

In one embodiment, the amount of mercapto-containing compound is from about 10 to about 20,000 ppm, more specifically about 100 to about 5,000 ppm and even more specifically, about 500 to about 2,000 ppm, based on the weight of the alkoxysilyl-containing polyurethane polymer.

In one embodiment, the mercapto-containing compound may be added to the reaction mixture after the formation of the isocyanate-containing polyurethane prepolymer or after the formation of the alkoxysilyl-containing polyurethane polymer composition. The addition involves simple mixing of the mercapto-containing compound with the isocyanate-containing polyurethane prepolymer composition or the alkoxysilyl-containing polyurethane polymer composition.

Hydrolysis and Condensation Catalysts

The alkoxysilyl-containing polyurethane polymer composition, which has been stabilized with the mercapto-compound, can be activated for moisture curing by the addition of a hydrolysis and condensation catalyst.

The hydrolysis and condensation catalyst are organometallic compounds known to catalyze the rates of hydrolysis and condensation. Suitable hydrolysis and condensation catalyst include organometallic salts or organometallic complexes. Examples of the metal portion of urethane forming organometallic catalysts useful in the present invention include titanium, aluminum, tin, zirconium, iron, cobalt, manganese, nickel, bismuth and zinc, more preferably tin, bismuth and zinc, and even more preferably tin. The urethane-forming organometallic catalysts include metal complexes, such as chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylaceone-alkylenediimines, salicylaldehydeimine, and the like, with the various metals such as Ti, Al, Sn, Zr, Fe, Co, Mn, Ni, Bi and Zn; and organometallic salts, such as alcoholates and phenolates of various metals such as $Ti(OR^8)_4$, $Al(OR^8)_3$, $Zr(OR^8)_2$, $Sn(OR^8)_4$, $Sn(OR^8)_2$, $Bi(OR^8)_3$ and the like, wherein $R^8$ is monovalent alkyl or aryl of from 1 to 18 carbon atoms, or carboxylates of various metals, such as $Zr(O(C{=}O)R^8)_2$, $Sn(O(C{=}O)R^8)_4$, $Sn(O(C{=}O)R^8)_2$, $Bi(O(C{=}O)R^8)_3$, $R^9{}_2Sn(O(C{=}O)R^8)_2$, where $R^8$ is monovalent alkyl or aryl of from 1 to 18 carbon atoms and $R^9$ is monovalent alkyl or aryl of from 1 to 18 carbon atoms; and reaction products of alcoholates of various metals with carboxylic acids, beta-diketones, and 2-(N,N-dialkylamino)alkanols.

In one specific embodiment organotin compounds that are dialkyltin salts of carboxylic acids, can include the non-limiting examples of dibutyltin diacetate, dibutyltin dilaurate, dibutyltin maleate, dilauryltin diacetate, dioctyltin diacetate, dibutyltin-bis(4-methylaminobenzoate), dibutyltin-bis(6-methylaminocaproate), and the like, and combinations thereof.

Similarly, in another specific embodiment there may be used trialkyltin hydroxide, dialkyltin oxide, dialkyltin dialkoxide, or dialkyltin dichloride and combinations thereof. Non-limiting examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-dimethylaminopentylate), dibutyltin dichloride, dioctyltin dichloride, and the like, and combinations thereof.

The amount of hydrolysis and condensation catalysts added to the alkoxysilyl-containing polyurethane polymer composition is from about 0.02 to about 1.0 weight percent, preferably from about 0.05 to about 0.5 weight percent and still more preferably from about 0.1 to about 0.3 weight percent metal, based on weight of the alkoxysilyl-containing polyurethane polymer.

Other Optional Components

The moisture-curable composition of the invention, in addition to an alkoxysilyl-containing polyurethane polymer (a), and a urethane-forming organometallic catalyst (b), a mercapto-containing compound (c) and, when curing is desired, a hydrolysis and condensation catalyst (d), may further include one or more optional components, e.g., any of the materials commonly included in moisture-curable coatings, sealants, adhesives and consumer and industrial good in known and conventional amounts.

For example, such optional components can include organic and inorganic compounds that contribute to the processing and flexibility of the uncured and cured alkoxysilyl-containing polyurethane polymer compositions. Optional components include organic solvents, polysiloxanes, isocyanate-reactive scavenging agents, water scavenger agents, desiccants, surfactants, colorants, plasticizers, extenders, fillers, adhesion promoters, organic resin modifiers, UV stabilizers, color stabilizers, wetting agents, flow and leveling additives, thixotropes, defoamers, and the like.

Solvents

One or more organic solvents can be used to lower the viscosity and improve the flow properties of the uncured compositions which are especially useful when the composition is to be used as a coating. A variety of solvents may be mentioned as exemplary, e.g., alcohols, glycols, triols, polyols, glycol ethers, esters, ketones, hydrocarbon, and the like.

Representative and non-limiting examples of specific solvents include mono-alcohols, such as methanol, ethanol, 1-propanol, 2-propanol (i-propanol), 2-methyl-1-propanol (i-butanol), 2-methyl-2-propanol (tert-butanol), 1-butanol, 2-butanol, 2-methyl-1-butanol, 2-methyl-2-butanol, 2,2-dimethyl-1-propanol, 1-pentanol, 2-pentanol, 4-methyl-2-pentanol; glycols such are propylene glycol, 1,3-butanedial, 1,4-butane diol, 2-methyl-1,3-propanediol, 2-methyl-2,4-pentanediol (hexylene glycol), diethylene glycol, triethylene glycol, tetraethylene glycol, poly(ethylene glycol), dipropylene glycol, tripropylene glycol, poly(propylene glycol), 1,5-pentanediol, esterdiol 204, 2,2,4-trimethylpentanediol, 2-ethyl-1,3-hexanediol, glycerol, glycerol ethoxylate, glycerol ethoxylate-co-propoxylate triol, glycerol propoxylate, pentaerythritol; glycol ethers such as 1-methoxy-2-propanol (propylene glycol methyl ether), 1-ethoxy-2-propanol, 1-propoxy-2-propanol, 1-butoxy-2-propanol, 2-methoxyethanol, 2-ethoxyethanol, 2-propoxyethanol, 2-butoxyethanol, 2-(2-methoxyethoxyl)ethanol, 2-(2-ethoxyethoxyl)ethanol, 2-(2-propoxyethoxyl)ethanol, 2-(2-butoxyethoxyl) ethanol (butyl carbitol), di(propylene glycol)butyl ether, tri(ethylene glycol)monomethyl ether, tri(ethylene glycol) monoethyl ether, tri(ethylene glycol)monobutyl ether, poly (ethylene glycol) methyl ether, poly(ethylene glycol)dimethylether, poly(ethylene glycol-co-propylene glycol), poly (ethylene glycol-co-propylene glycol)monobutyl ether, poly (propylene glycol)monobutyl ether, di(propylene glycol) dimethylether; esters including methyl acetate, ethyl acetate, ethyl lactate, 2-methoxyethyl acetate, 2-ethoxyethyl acetate, 2-butoxyethyl acetate, 2-(2-methoxyethoxyl)ethyl acetate, 2-(2-ethoxyethoxyl)ethyl acetate, 2-(2-butoxyethoxyl)ethyl acetate, glycol diacetate, triethylene glycol diacetate, propylene glycol methyl ether acetate (1-methoxy-2-propanol acetate), propylene glycol ethyl ether acetate, ketones including acetone, methyl ethyl ketone, 2,4-pentane dione, diacetone alcohol and hydrocarbons including toluene, xylene, naptha, mineral spirits, hexane, heptane, cyclohexane and mixtures thereof.

In certain embodiments, the solvent(s) can be present in the moisture-curable composition of the invention in an amount ranging from 1 to about 80 percent by weight, advantageously from about 10 to about 30, and in some embodiments, from about 10 to about 25, percent by weight based on the total weight of the composition.

Surfactants

One or more surfactants may be used to aid in the wetting and leveling of the moisture-curable alkoxysilyl-containing polyurethane polymer composition of the invention especially where the composition is to be used as a coating. Useful surfactants include nonionic, cationic, anionic, amphoteric and/or zwitterionic surfactants. The surfactants are typically hydrocarbon-based, silicone-based or fluorocarbon-based. Useful surfactants having short chain hydrophobes. Other useful surfactants include alkoxylates, especially ethoxylates, containing block copolymers including copolymers of ethylene oxide, propylene oxide, butylene oxide, and mixtures thereof; alkylarylalkoxylates, especially ethoxylates or propoxylates and their derivatives including alkyl phenol ethoxylate; arylarylalkoxylates, especially ethoxylates or propoxylates, and their derivatives; amine alkoxylates, especially amine ethoxylates; fatty acid alkoxylates; fatty alcohol alkoxylates; alkyl sulfonates; alkyl benzene and alkyl naphthalene sulfonates; sulfated fatty alcohols, amines or acid amides; acid esters of sodium isethionate; esters of sodium sulfosuccinate; sulfated or sulfonated fatty acid esters; petroleum sulfonates; N-acyl sarcosinates; alkyl polyglycosides; alkyl ethoxylated amines; and mixtures thereof.

Representative non-limiting examples of surfactants include alkyl acetylenic diols sold by Air Products under the trade name Surfonyl®, pyrrilodone-based surfactants sold by ISP under the trade name Surfadone-LP® 100, 2-ethyl hexyl sulfate, isodecyl alcohol ethoxylates sold by Rhodia under the trade name Rhodasurf® 530, ethylene diamine alkoxylates sold by BASF under the trade name Tetronics®, ethylene oxide/propylene oxide copolymers sold by BASF under the trade name Pluronics®, and diphenyl ether Gemini type surfactants sold by Dow Chemical Corporation under the trade name Dowfax®.

In general, the moisture-curable composition herein can contain optional surfactant(s) in an amount of from about 0.01 to about 5, and advantageously from about 0.05 to about 2, weight percent and in certain embodiments, from about 0.1 to about 1 weight percent based on the total weight of the composition.

Colorants

The moisture-curable alkoxysilyl-containing polyurethane polymer composition of the invention can include a colorant. As used herein, the term “colorant” means any substance that imparts color and/or other opacity and/or other visual effect to the polymer. The colorant can be added to the silylated polyurethane polymer composition in any suitable form such as discrete particles, dispersions, solutions, flakes, etc. A single colorant or a mixture of two or more colorants can be used in the moisture-curable composition of the invention.

Useful colorants include pigments, dyes and tints such as those used in the paint industry and/or listed in the Dry Color Manufacturers Association (DCMA), as well as special-effect materials. A useful type of colorant can be a finely divided solid powder that is insoluble but wettable under the conditions of use. A colorant can be organic or inorganic and can be agglomerated or non-agglomerated. Colorants can be added to the moisture-curable composition herein by use of a grinding vehicle such as an acrylic grinding vehicle the use of which is familiar to those skilled in the art.

Illustrative useful pigments and pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red, titanium dioxide, carbon black and mixtures thereof. The terms “pigment” and “colored filler” can be used interchangeably.

Useful dyes include, but are not limited to, those that are solvent and/or aqueous based such as phthalo green or blue, iron oxide, bismuth vanadate, anthraquinone, perylene, aluminum and quinacridone.

Useful tints include, but are not limited to, pigments dispersed in water-based or water miscible carriers such as Aqua-Chem® 896 commercially available from Degussa, Inc., Charisma Colorants® and Maxitoner Industrial Colorants® commercially available from Accurate Dispersions division of Eastman Chemical, Inc.

In general, the colorant can be present in the moisture-curable composition herein in any amount that is sufficient to impart the desired visual and/or color effect. The colorant can comprise from, e.g., from about 1 to about 65 weight percent of the silylated polyurethane polymer composition, such as from about 3 to about 40 weight percent or from about 5 to about 35 weight percent thereof based on the total weight of the composition.

Fillers

The moisture-curable alkoxysilyl-containing polyurethane polymer composition of the invention can include one or more fillers. The filler can be any inorganic or organic filler that reinforces and/or extends the composition. Useful fillers include, e.g., reinforcing fillers such as carbon black, fumed silica, precipitated silica, clays, talc, aluminum silicates, metal oxides and hydroxides, and extending fillers such as treated and untreated calcium carbonates, and the like. Fillers can be in the form of powders, particulates, aggregates, agglomerates, platelets, fibers, etc. In one embodiment, one or more fillers are combined with silane coupling agents.

To further improve the physical strength of a cured moisture-curable alkoxysilyl-containing polyurethane polymer composition herein, reinforcing carbon black can be used as a main filler resulting in black or darkly colored silylated polyurethane polymer compositions. Several commercial grades of carbon black useful in this invention are commercially available such as the Corax® products from Degussa. To obtain a colorless/translucent moisture-curable composition, higher levels of fumed silica or precipitated silica can be used as the main filler to the exclusion of carbon black. The surface area of the filler can be more than 20 $meters^2/gram$.

Treated calcium carbonates, such as those having average particle sizes from 0.07 microns to 4 microns, are preferred fillers and are available under several trade names, such as: Ultra Pflex® and HiPflex® from Specialty Minerals; Winnofil® SPM and Winnofil® SPT from Zeneca Resins; Hubercarb®Qt, Hubercarb® 3 Qt and Hubercarb® W from Huber and Kotomite® from ECC; Omyabond® 520, Omyacarb® 3, Omyacarb® 5 from Omya, and the like. These fillers can be used either alone or in combination.

The optional fillers can be included in the moisture-curable composition herein in an amount of up to about 80 weight percent, advantageously in an amount of from about 0.1 weight percent to about 50 weight percent, and in certain embodiments, in an amount of from about 20 to about 50 weight percent based on the total weight of the composition.

Plasticizers and Thixotropes

The moisture-curable alkoxysilyl-containing polyurethane polymer composition herein can optionally include one or more plasticizers. Exemplary plasticizers include phthalates, dipropylene and diethylene glycol dibenzoates and mixtures thereof, epoxidized soybean oil, and the like. Useful commercial dioctyl and diisodecyl phthalates include Jayflex® DOP and Jayflex® DIDP from Exxon Chemical. Dibenzoate plasticizers are available as Benzoflex® 9-88, Benzoflex® 50 and Benzoflex® 400 from Velsicol Chemical Corporation; Mesamoll® from Lanxess. The optional plasticizer(s) can represent up to about 100 parts by weight per hundred parts of the moisture-curable composition with up to 40 parts by weight per hundred parts of the composition being preferred.

Ooptional thixotropes that may be incorporated in the moisture-curable composition of the invention include various castor waxes, fumed silica, treated clays and polyamides. Commercially available thixotropes include, e.g., Aerosil from Degussa, Cabo-Sil TS 720 from Cabot, Castorwax from CasChem, Thixatrol and Thixcin from Rheox, Crayvallac from Crayvalley Corp. and Dislon from King Industries.

Isocyanate-Reactive Quenching Agents

In the moisture-curable alkoxysilyl-containing polyurethane polymer compositions, an optional isocyanate-reactive quenching agent can be added, as discussed above. The quenching agent possessing at least one active hydrogen and that reacts with isocyanate at a rate greater than that of undesired reactions that cause an increase in viscosity such as the further reaction of isocyanate with hydroxyl-terminated polymers if there is still hydroxyl present, reaction of isocyanate with urethane to form allophanate and reaction of isocyanate with urea to form biuret.

An isocyanate-reactive quenching agent can be added to the reaction mixture at a desired point at or near the end of the silylation reaction. It is understood that for di- or polyisocyanate-extended polyols the hydroxyl-terminated polyurethane polymer may contain residual isocyanate, either from partially reacted di- or polyisocyanate, or from unreacted di- or polyisocyanate. The residual isocyanate present in the silylated polyurethane polymer composition can come from the di- or polyisocyanate used to chain extend polyol (ii), or from the isocyanato-containing alkoxysilane used to react with the hydroxyl-terminated polymer. The desired point for the addition of the isocyanate-reactive agent can be determined by the viscosity of the reaction mixture, or by some other method. Thus, the isocyanate-reactive scavenging agent is added to the reaction mixture at a particular viscosity depending on formulation and the desired properties of the final product.

In one embodiment of the invention, the isocyanate-reactive scavenging agent is added to the reaction mixture at a viscosity range from about 1,000 cP to about 150,000 cP when measured at a temperature of 25° C., and in another embodiment of the invention from about 30,000 cP to about 75,000 cP when measured at a temperature of 25° C. In this manner, the isocyanate-reactive scavenging agent minimizes batch-to-batch variation of the final viscosity of the silylated polyurethane polymer composition and lowers or eliminate the exposure of workers and consumers to reactive isocyanates.

Antioxidants

Optional antioxidants and stabilizers can be added to the moisture-curable alkoxysilyl-containing polyurethane polymer composition of the invention to provide protection against oxidative change. The quantities in which antioxidants can be used vary within wide limits, e.g., from about 0.01 to about 10 weight percent and, more particularly, from about 0.01 to about 3 weight percent, based on the weight of the composition.

Water Scavenging Agents

A water scavenging agent can optionally be added to the moisture-curable alkoxysilyl-containing polyurethane polymer composition herein to improve its package stability and to prevent premature curing. Useful water scavenging agents include alkoxysilanes, e.g., vinyltrimethoxysilane, methyltrimethoxysilane, and the like. The concentration of water scavenging agents can be in the range of from about 0 to about 5 weight percent, more preferably from about 0.5 to about 5 weight percent, and even more preferably about 1 to about 4 weight percent, based on the weight of the composition.

As an alternative or in addition to optional water scavenging agent, desiccant can optionally be added to the moisture-curable composition herein to improve its package stability and to prevent premature curing. Any known or conventional desiccant, e.g., silica gel, can be utilized for this purpose.

Color Stabilizer

According to one embodiment of the invention, a color stabilizer can be added to moisture-curable composition to reduce its yellowing overtime. Representative non-limiting examples of color stabilizers include, e.g., triphenyl phosphite, diphenyl-alkyl phosphites, phenyl-dialkyl phosphites, tris(nonylphenyl)phosphite, trilauryl phosphite, trioctadecyl phosphite, distearyl-pentaerythritol diphosphite, tris(2,4-di-tert-butylphenyl)phosphite, diisodecyl pentaerythritol diphosphite, bis(2,4-di-tert-butylphenyl)-pentaerythritol diphosphite, bis(2,4-di-cumylphenyl)-pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, bis(2,4-di-tert-butyl-6-methylphenyl)-methyl phosphite, bis(2,4-di-tert-butyl-6-methylphenyl)-ethyl phosphite, 2,2',2"-nitrilo-[triethyltris(3,3',5,5'-tetra-tert-butyl-1,1'-biph-enyl-2,2'-diyl)phosphite] and 2-ethylhexyl(3,3',5,5'-tetra-tert-butyl-1,1'-biphenyl-2,2'-diyl)phosphite.

In one embodiment, the amount of color stabilizer used can vary from about 0.01 to about 3 weight percent and preferably from about 0.5 to about 2 weight percent, based on the weight of the moisture-curable composition.

All references cited herein are incorporated by reference herein in their entirety.

The invention can be better understood by reference to the following examples in which the parts and percentages are by weight unless otherwise indicated.

EXAMPLES

The following materials are used in the Examples to follow and/or are well suited for inclusion in a stabilized polymer in accordance with the invention. The Examples should be interpreted as illustrative only and not as limiting the scope of the invention.

Reagents used in the following experiments include Silquest* A-171 silane having the structure vinyltrimethoxysilane, Silquest* A-1120 silane having the structure N-(2-aminoethyl)-3-aminopropyltrimethoxysilane, Silquest* A-1891 silane having the structure gamma-mercaptopropyltriethoxysilane, Silquest* A-1891 silane having the structure gamma-mercaptopropyltriethoxysilane, Mercaptan Y having the structure gamma-mercaptopropyltrimethoxysilane. These reagents are all available from Momentive Performance Materials Inc. (* denotes a trademark of Momentive Performance Materials Inc. and/or an affiliate thereof.)

Example 1

Preparation of Alkoxysilyl-Containing Polyurethane Polymer Composition

Into a 2-liter resin kettle was charged 864 grams of dried hydroxyl-terminated polypropylene oxide (available as Acclaim 18200 N from Covestro, 0.046 mole), 4.3 grams of Irganox 1135, a benzenepropanoic acid, 3,5-bis(1,1-dimethyl-ethyl)-4-hydroxy-C7-C9 branched alkyl ester processing stabilizer (available from BASF) and 12 ppm of urethane-forming organometallic catalyst, dibutyltin dilaurate and then heated up to 60° C. with agitation and over an atmosphere of nitrogen. After 10 minutes, 24.33 grams of 3-isocyanatopropyltrimethoxysilane (available as Silquest* A-Link* 35 from Momentive Performance Materials Inc, 0.106 mole) was added in. The mixture was heated to a temperature of about 78° C. and held at temperature until the NCO content reached near zero (by titration). The reaction mixture was allowed to cool and then 7.2 grams of methanol were added to quench any remained isocyanate.

Example 2

Preparation of Moisture-Stabilized Alkoxysilyl-Containing Polyurethane Polymer Composition Into a resin kettle was charged 250 grams of alkoxysilyl-containing polyurethane polymer composition of Example 1 and 0.125 gram of Mercaptan Y, 3-mercaptopropyltrimethoxysilane (available from Momentive Performance Materials, Inc.). The mixture was blended twice at room temperature in a speed mixer for 2 minutes. The mixture were stored at room temperature.

Example 3

Moisture-Stabilized Alkoxysilyl-Containing Polyurethane Polymer Composition

Into a resin kettle was charged 250 grams of alkoxysilyl-containing polyurethane polymer composition of Example 1 and 0.250 grams of Silquest T-cure (a proprietary mercapto-functional silane available from Momentive Performance Materials Inc.). The mixture was blended twice at room temperature in a speed mixer for 2 minutes. The mixture were stored at room temperature.

Comparative Example A

Into a resin kettle was charged 250 grams of alkoxysilyl-containing polyurethane polymer composition of Example 1 and 2.50 grams of vinyltrimethoxysilane (available as Silquest* A-171 silane from Momentive Performance Materials Inc.). The mixture was blended twice at room temperature in a speed mixer for 2 minutes. The mixture was stored at room temperature.

Examples 3 and 4, Comparative Example B

Preparation and Testing of the Sealants

A masterbatch of a basic sealant formulation was prepared. Into a Ross Planetary mixer were charged 199.5 grams of diisodecyl phthalate, aplasticizer (available as Jaflex DIDP from Exxon-Mobil), 1.14 gram of a mixture of alpha-[3-[3-(2H-benzotriazol-2-yl)-5-(1,1-dimethylethyl)-4-hydroxyphenyl]-1-oxopropyl]-omega-hydroxypoly(oxo-1,2-ethanediyl); alpha-[3-[3-(2H-benzotriazol-2-yl)-5-(1,dimethylethyl)-4-hydroxyphenyl]-1-oxopropyl]-amega-[3-[3-(2H-benzotriazol-2-yl)-5-(1,1-dimethylethyl)-4-hydroxyphenyl]-1-oxopropoxy]poly(oxy-1,2-ethanediyl); and polyethylene glycol with a molecular weight of 300, a UV absorber (available as Eversorb 80) and 1.14 gram of a mixture of bis-(N-methyl,2,2,6,6-tetramethyl-4-piperidinyl) sebacate and methyl-(N-methyl,2,2,6,6-tetramethyl-4piperidinyl) sebacate, a hindered amine light stabilizer (available as Eversorb 765). The mixture was mixed for 10 minutes and then 294.5 grams of dried precipitated calcium carbonate (available as Ultra-Pflex from Cary Company) and 294.5 grams dried ground limestone, a filler (available as Hi-Pflex from Cary Company) were added and mixed. A titanium oxide pigment (28.5 grams available as Ti Pure 960 from Chemours Company) and 10.45 grams of thermoplastic silicone polycarbonate urethane, a thermoplastic urethane copolymer containing silicone as a soft segment stabilizer (available as Carbo-Sil TS 720 from Cabot Corporation) were added and mixed until homogenous. Into the mixture was added 5.415 grams of 2-amioethy-3-aminopropyltrimethoxysilane (available as Silquest* A-1120J silane from Momentive Performance Materials, Inc.) and 4.37 grams of vinyltrimethoxysilane (available as Silquest* A-171 silane from Momentive Performance Materials. Inc.) were added and mixed for 15 minutes. The master batch was packed into cartridges.

Into a speed mixer was charged 11.5 grams of the moisture-stabilized alkoxysilyl-containing polyurethane polymer composition prepared in Example 2 and 38.46 gram of the masterbatch and mixed in a speed mixer at 2700 rpm for 2 min. The walls were scraped down with a wooden stir bar, and then mixed for another 2 minutes. Finally 0.08 weight percent of dibutyltin diluarate (available as Fomrez SUL-4 from Galata Chemicals) was added to the sealant mixture and mixed at 2700 rpm for 1 minute. Similar sealant formulations were prepared using the compositions of Example 3 and Comparative Example A. The formulations are presented in Table 1.

TABLE 1

Sealant Examples 3 and 4 and comparative Example B.

| Ingredient | Sealant Example 3, grams | Sealant Example 4, grams | Sealant Comparative Example B, grams |
|---|---|---|---|
| Masterbatch | 76.92 | 76.92 | 76.92 |
| Example 2 | 23.0 | | |
| Example 3 | | 23.0 | |
| Comparative Example A | | | 23.0 |
| Fomrez SUL-4 | 0.08 | 0.08 | 0.08 |
| Total | 100.0 | 100.0 | 100.0 |

Test of Moisture Sensitivity

The stabilized moisture-curable alkoxysilyl-containing polyurethane polymer compositions were placed into an aluminum open pan at a thickness of 3 to 4 millimeter. The samples in the aluminum pan were placed into a humidity chamber at 23° C. and 50% relative humidity. The initial viscosity was measured and then every other day, for totally 12 days. The data are presented in Table 2. Unless otherwise stated, viscosities reported herein were measured at 25° C. using a Brookfield DV3T viscometer with a CPA-52Z cone at 50% torque.

TABLE 2

| Measure of the Moisture Sensitivity of Stabilized Moisture-curable Alkoxysilyl-containing Polyurethane Polymer Compositions | | | |
|---|---|---|---|
| Days of Exposure | Example 2, cps | Example 3, cps | Comparative Example A, cps |
| 0 | 29440 | 32010 | 25500 |
| 2 | 31130 | 34300 | 35050 |
| 5 | 36010 | 35860 | 48600 |
| 7 | 37800 | 36600 | 58800 |
| 9 | 40010 | 37090 | 67270 |
| 12 | 44010 | 37800 | 86450 |

The change in viscosity of the moisture-curable alkoxysilyl-containing polyurethane polymer compositions is an indication of the effectiveness of the mercapto-containing compound at stabilizing the composition. Examples 2 and 3 exhibited only minor increases in viscosity, especially Example 3, in which the viscosity increase only 18 percent. The control, a vinyltrimethoxysilane stabilized composition, exhibited a 240 percent increase in viscosity.

Mechanical Properties of Sealants Prepared from Moisture-Curable Alkoxysilyl-Containing Polyurethane Polymer Compositions The sealants prepared above were casted into a HDPE mold to form a film having a thickness of about 2.5 mm. The film were cured in a humidity chamber at 23° C. and 50% relative humidity. Skin time was determined by touching the samples and determining the tack. The film was then cured for 7 days and removed from the molds.

The tensile physical properties were determined according to the procedures in ASTM D412, Standard Test Method for Vulcanized Rubber and Thermoplastic Elastomer, and hardness by ASTM C661-06, Standard Test Method for Indentation Hardness of Elastomeric-Type Sealants by Means of a Durometer. The data are presented in Table 3.

TABLE 4

| Cured Properties of Sealants | | | |
|---|---|---|---|
| Measure | Sealant Example 3 | Sealant Example 4 | Sealant, Comparative Example B |
| Skin time, minutes | 25 | 35 | 47 |
| Tensile strength at maximum elongation, psi | 314 | 281 | 313 |
| Modulus at 100% elongation, psi | 173 | 190 | 173 |
| Elongation at maximum, % | 330 | 239 | 344 |
| Shore Hardness | 47 | 47 | 47 |

As shown in Table 4, the tensile strength, elongation, elastic modulus, and Shore A Hardness of sealants Examples 3 and 4, were comparable to that of the Sealant of Comparative Example B. However, the skin times were significantly reduced. The skin time of Comparative Example B was twice as long as the skin time for Example 3. Accordingly, small amounts of mercapto-containing compounds were able to stabilize the stabilized moisture-curable alkoxysilyl-containing polyurethane polymer compositions, and when activated by adding the hydrolysis and condensation catalysts, were able to cure fast, as measured by the skin time, without affecting mechanical properties.

While the invention has been described with reference to certain embodiments, it will be understood by those skilled in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed herein, but that the invention will include all embodiments falling within the scope of the appended claims.

The invention claimed is:

1. A stabilized moisture curable alkoxysilyl-containing polyurethane polymer composition comprising:

(a) at least one alkoxysilyl-containing polyurethane polymer;

(b) at least one urethane-forming organometallic catalyst selected from the group consisting of: (i) catalytic organometallic salts of Sn, and (ii) catalytic organometallic complexes of Sn; and (c) at least one mercapto-containing compound in the amount of from about 100 to about 5,000 parts per million (ppm), based on the weight of the alkoxysilyl-containing polyurethane polymer;

wherein the urethane-forming organometallic catalyst is used in the amount of from 1 to 100 parts per million, based on the weight of the metal in the polyol brought to reaction with isocyanato-containing alkoxysilane or polyisocyanate in the preparation of the alkoxysilyl-containing polyurethane, wherein the metal is the metal portion of the organometallic catalyst.

2. The composition of claim 1, wherein the alkoxysilyl-containing polyurethane polymer has the general formula (I):

(I)

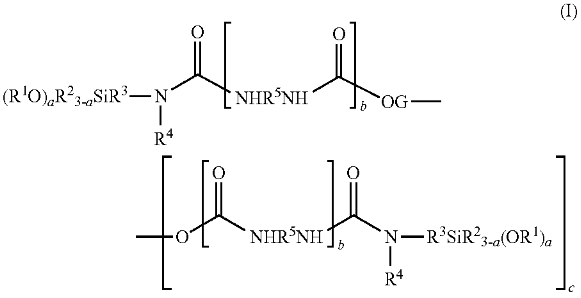

wherein each $R^1$ is independently a monovalent alkyl group of from 1 to 6 carbon atoms;

each $R^2$ is independently a monovalent alkyl group of from 1 to 4 carbon atoms or phenyl group;

each $R^3$ is independently a divalent alkyl group of from 1 to 12 carbon atoms;

each $R^4$ is independently a monovalent alkyl group of from 1 to 6 carbon atoms, phenyl group, hydrogen or $—R^3SiR^2_{3-a}(OR^1)_a$ group;

each $R^5$ is independently a divalent organic group selected from the group consisting of a divalent alkyl group having 1 to 16 carbon atoms, a divalent cycloalkyl group having 5 to 16 carbon atoms and the group $X^1$ having the general formula (II):

(II)

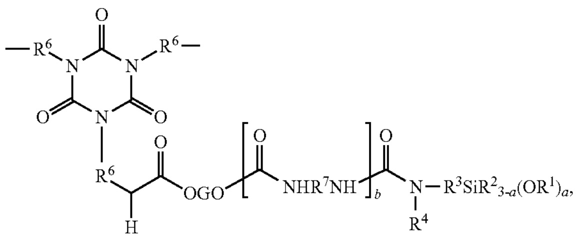

where each $R^6$ is independently an alkylene group of from 1 to 12 carbon atoms or a cycloalkylene group of from 5 to 16 carbon atoms and each $R^7$ is independently a divalent organic group selected from the group consisting of a divalent alkyl group having 1 to 16 carbon atoms and a divalent cycloalkyl group having 5 to 16 carbon atoms;

each G is a polyvalent organic group derived from a polyol or a monovalent organic group derived from a monol; and the subscripts a, b and c are integers wherein a is 1, 2 or 3, b is 0 or 1 and c is 1 to 5, with the proviso that if b is 0, then $R^4$ is hydrogen.

3. The composition of claim 2, wherein G is a polyvalent organic group derived from a polyol or monol and formed by the removing the hydroxyl group of the polyol and wherein the polyol is selected from the group consisting of a polyester polyol, polyether polyol, polycarbonate polyol, polybutadiene polyol, polybutylene polyol, polyol derived from polystyrene/butadiene copolymer, polyisoprene polyol, poly(meth)acrylate polyol, polyisocyanate extended polyester polyol, polyisocyanate extended polyether polyols, polyisocyanate extended polycarbonate polyol, polyisocyanate extended polyol derived from polystyrene/butadiene copolymer, polyisocyanate extended polyisoprene polyol, polyisocyanate extended poly(meth)acrylate polyol, polyisocyanate extended polybutadiene polyol, polyisocyanate extended polybutylene polyol and mixtures thereof.

4. The composition of claim 1, wherein the urethane-forming organometallic catalyst is metal complexes obtained from acetylacetone, benzoylacetone, trifluoroacetylacetone, ethyl acetoacetate, salicylaldehyde, cyclopentanone-2-carboxylate, acetylacetoneimine, bis-acetylaceone-alkylenediimines, salicylaldehydeimine chelate and Sn; organometallic salts selected from the group consisting of $Sn(OR^7)_4$, $Sn(OR^7)_2$, $Sn(O(C{=}O)R^7)_4$, $Sn(O(C{=}O)R^7)_2$, $R^8_2Sn(O(C{-}O)R^7)_2$, where $R^7$ is monovalent alkyl or aryl of from 1 to 18 carbon atoms and $R^8$ is monovalent alkyl or aryl of from 1 to 18 carbon atoms and combinations thereof.

5. The composition of claim 4, wherein the organometallic salts are selected from the group consisting of dibutyltin diacetate, dibutyltin dilaurate, dibutyltin maleate, dilauryltin diacetate, dioctyltin diacetate, dibutyltin-bis(4-methylaminobenzoate), dibutyltin-bis(6-methylaminocaproate) and combinations thereof.

6. The composition of claim 4, wherein the organometallic salts are selected from the group consisting of trialkyltin hydroxide, dialkyltin oxide, dialkyltin dialkoxide, and dialkyltin dichloride and combinations thereof.

7. The composition of claim 6, wherein the organometallic salts are selected from the group consisting of trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-dimethylaminopentylate), dibutyltin dichloride, dioctyltin dichloride and combinations thereof.

8. The composition of claim 1, wherein the urethane-forming catalyst is used in the amount of from 5 to 50 parts per million, based on the weight of the metal portion of the organometallic catalyst added in the polyol.

9. The composition of claim 1, wherein the mercapto-containing compound has the general formula (IX):

$$(HS)_oR^{11}X^2_p \quad \text{(IX)}$$

wherein:

each $R^{11}$ is independently a divalent or polyvalent hydrocarbon containing 1 to 20 carbon atoms or a divalent or polyvalent hydrocarbon containing 1 to 20 carbon atoms and at least one oxygen atom;

each $X^2$ is independently a functional group selected from the group consisting of hydroxyl (—OH), carboxyl (—C(=O) OH), ester (—C(=O)$OR^{17}$, where $R^{17}$ is a divalent alkyl group of from 1 to 10 carbon atoms or a divalent alkyl group of from 1 to 10 carbon atom and substituted with at least one hydroxyl group), carboxylate salt (—$C(=O)^-OHN^+(R^{12})(R^{13})_2$, where $R^{12}$ is a chemical bond to $R^{11}$, hydrogen or a monovalent hydrocarbon group of from 1 to 12 carbon atoms, and each $R^{13}$ is independently a hydrogen or a monovalent hydrocarbon group of from 1 to 12 carbon atoms), amino —$NR^{13}_2$ (where each $R^{13}$ is independently a hydrogen, a hydrocarbon group of from 1 to 12 carbon atoms, or an alkoxysilyl group (—$Si(OR^{14})_c(R^{15})_{3-e}$ where each $R^{14}$ is independently a monovalent alkyl group of from 1 to 10 carbon atoms, a monovalent alkyl group of from 1 to 10 carbon atom and substituted with at least one hydroxyl group, a monovalent alkyl group of containing from 3 to 30 carbon atoms and at least one oxygen atom, or a —$R^{16}O[Si(R^{11}(SH)_o)(OR^{17})_f(R^{15})_{1-f}]_qOR^{18}$ group wherein each $R^{15}$ is independently methyl or phenyl, each $R^{16}$ is independently a divalent alkyl group of from 1 to 10 carbon atoms or a divalent alkyl group of from 1 to 10 carbon atom and substituted with at least one hydroxyl group; each $R^{17}$ is independently a divalent alkyl group of from 1 to 10 carbon atoms or a divalent alkyl group of from 1 to 10 carbon atom and substituted with at least one hydroxyl group, each $R^{18}$ is independently a divalent alkyl group of from 1 to 10 carbon atoms or a divalent alkyl group of from 1 to 10 carbon atom and substituted with at least one hydroxyl group and the subscripts e, f and q are integers where e is 2 or 3, f is 0 or 1, and q is 1 to 5), with the provisos that (i) when $R^{13}$ is a monovalent hydrocarbon group of from 1 to 12 carbon atoms, then two $R^{13}$ groups are bonded together through a covalent bond to generate a divalent group —$R^{13}$—$R^{13}$-which forms a ring containing the nitrogen atom;

(ii) when f is 1, then $R^{17}$ and $R^{18}$ are bonded together by a covalent bond to form a divalent group —$R^{17}$—$R^{18}$—, which forms a ring containing the silicon atom and two oxygen atoms; and (iii) when $R^{14}$ is an alkyl group of 1 to 10 carbon atoms, then two $R^{14}$ groups are bonded together through a covalent bond to from a divalent —$R^{14}$—$R^{14}$— group, which forms a ring containing a silicon atom and two oxygen atoms; and the subscripts o and p are integers where o is 1, 2 or 3 and p is 0, 1 or 2.

10. The composition of claim 9, wherein $R^{11}$ is a divalent alkyl group of from 1 to 20 carbons, $X^2$ is —OH, —C(═O) $OR^{17}$, where $R^{17}$ is independently a divalent alkyl group of from 1 to 10 carbon atoms or a divalent alkyl group of from 1 to 10 carbon atom and substituted with at least one hydroxyl group, or C(═O) OH, and o is 1 and p is 1.

11. The composition of claim 9, wherein $R^{11}$ is a divalent alkyl group of from 1 to 20 carbon atoms, $X^2$ is $Si(OR^{14})_e(R^{15})_{3-e}$, where each $R^{14}$ is independently a monovalent alkyl group of from 1 to 6 carbon atoms, a monovalent alkyl group of from 1 to 6 carbon atoms and substituted with one hydroxyl group or a monovalent alkyl group containing from 3 to 30 carbon atoms and from 1 to 13 oxygen atoms, with the proviso that the oxygen atoms are separated from each other by at least two carbon atoms, $R^{15}$ is methyl, e is 2 or 3, o is 1 and p is 1.

12. The composition of claim 9, wherein $R^{11}$ is a divalent alkyl group of from 1 to 20 carbon atoms, $X^2$ is $Si(OR^{14})_c(R^{15})_{3-e}$, where each $R^{14}$ is a monovalent alkyl group of from 1 to 10 carbon atom and substituted with one hydroxyl group or where one $R^{14}$ is a monovalent alkyl group of from 1 to 10 carbon atom and substituted with one hydroxyl group, and the other two $R^{14}$ groups are monovalent alkyl groups of from 1 to 10 carbon atoms which are bonded together through a covalent bond to generate a divalent group-$R^{14}$—$R^{14}$—, which forms a ring containing a silicon atom and two oxygen atoms, e is 3, o is 1 and p is 1.

13. The composition of claim 9, wherein $R^{11}$ is a divalent alkyl group of from 1 to 20 carbon atoms, $X^2$ is $Si(OR^{14})_e(R^{15})_{3-e}$, where each $R^{14}$ is a monovalent alkyl group of from 1 to 10 carbon atom and substituted with one hydroxyl group or a $—R^{16}O\ [Si(R^{11}\ (SH)_o)(OR^{17})_f(R^{15})_{1-f}]_qOR^{18}$ group wherein each $R^{15}$ is methyl, each $R^{16}$ is independently a divalent alkyl group of from 1 to 10 carbon atoms; each $R^{17}$ is independently a divalent alkyl group of from 1 to 10 carbon atoms or a divalent alkyl group of from 1 to 10 carbon atom and substituted with at least one hydroxyl group, each $R^{18}$ is independently a divalent alkyl group of from 1 to 10 carbon atoms or a divalent alkyl group of from 1 to 10 carbon atom and substituted with at least one hydroxyl group and the subscripts e, f and q are integers where e is 2 or 3, f is 0 or 1, and q is 1 to 5, with the proviso that when f is 1, then $R^{17}$ and $R^{18}$ are bonded together by a covalent bond to form a divalent group $—R^{17}—R^{18}—$, which forms a ring containing the silicon atom and two oxygen atoms.

14. The composition of claim 9, wherein the mercapto-containing compound is selected from the group consisting of 1-mercaptododecane, 1-mercapto-2-hydroxyethane, 1-mercapto-3-hydroxypropane, 2-mercaptoacetic acid, methyl 3-mercaptopropropanoic acid, cysteine, 2-mercaptoethyl trimethoxysilane, 3-mercaptopropyl trimethoxysilane, 2-mercaptopropyl triethoxysilane, 3-mercaptopropyl triethoxysilane, 2-mercaptoethyl tripropoxysilane, 2-mercaptoethyl tri sec-butoxysilane, 3-mercaptopropyl tri-t-butoxysilane, 3-mercaptopropyl triisopropoxysilane, 2-mercaptoethyl dimethoxy ethoxysilane, 3-mercaptopropyl methoxyethoxypropoxysilane, 3-mercaptopropyl dimethoxy methylsilane, 3-mercaptopropyl methoxy dimethylsilane, 3-mercaptopropyl ethoxy dimethylsilane, 3-mercaptopropyl diethoxy methylsilane, 3-mercaptopropyl cyclohexoxy dimethyl silane, 4-mercaptobutyl trimethoxysilane, 3-mercapto-3-methylpropyltrimethoxysilane, 3-mercapto-3-methylpropyl-tripropoxysilane, 3-mercapto-3-ethylpropyl-dimethoxy methylsilane, 3-mercapto-2-methylpropyl trimethoxysilane, 3-mercapto-2-methylpropyl dimethoxy phenylsilane, 3-mercaptocyclohexyl-trimethoxysilane, 12-mercaptododecyl trimethoxy silane, 12-mercaptododecyl triethoxy silane, 2-mercapto-2-methylethyl-tripropoxysilane, 2-mercaptophenyl trimethoxysilane, 2-mercaptophenyl triethoxysilane, 2-mercaptotolyl trimethoxysilane, 2-mercaptotolyl triethoxysilane, 1-mercaptomethyltolyltrimethoxysilane, 1-mercaptomethyltolyl triethoxysilane, 2-mercaptoethylphenyl trimethoxysilane, 2-mercaptoethylphenyl triethoxysilane, 2-mercaptoethyltolyl trimethoxysilane, 2-mercaptoethyltolyl triethoxysilane, 3-mercaptopropylphenyl trimethoxysilane, 3-mercaptopropylphenyl triethoxysilane; 3-(2-{3-[2-(3-mercapto-propyl)-5-methyl-[1,3,2]dioxasilinan-2-yloxy]-2-methyl-propoxy}-5-methyl-[1,3,2]dioxasilinan-2-yl)-propane-1-thiol; 3-(2-{3-[2-(3-mercapto-propy)-4,4,6-trimethyl-[1,3,2]dioxasilinan-2-yloxy]-2-methyl-propoxy}-4,4,6-trimethyl-[1,3,2]dioxasilinan-2-yl)-propane-thiol; 3-(2-{3-[2-(3-mercapto-propyl)-4,4,6-trimethyl-[1,3,2]dioxasilinan-2-yloxy]-1,1-dimethyl-butoxy}-4,4,6-trimethyl-[1,3,2]dioxasilinan-2-yl)-propane-1-thiol; 3-({3-[2-mercapto-propyl)-5-methyl-[1,3,2]dioxasilinan-yloxy]-2-methyl-propoxy}-bis-[3-hydroxy-2-methyl-propoxy]-silanyl)-propane-1-thiol; 3-[{3-[{3-bis-(3-hydroxy-2-methyl-propyl)-(3-mercapto-propyl)-silanyloxy]-1-methyl-propoxy}-(3-hydroxy-2-methyl-propoxy)-(3-mercapto-propyl)-silanyloxy]-2-methyl-propan-1-ol; 3-[[3-((3-hydroxy-3-methyl-propoxy)-3-mercapto-propyl)-{3-[2-(3-mercapto-propyl)-5-methyl-[1,3,2]dioxasilinan-2-yloxy]-1-methyl-propoxy}-silanyloxy)-2-methyl-propoxy-(3-hydroxy-2-methyl-propoxy)-3-mercapto-propyl)-silanyl]-2-methylpropan-1-ol; 3-(2-{3-[2-(3-mercapato-butyl)-[1,3,2]dioxasilinan-2-yloxy]-propoxy}-[1,3,2]dioxasilinan-2-yl)-butane-1-thiol; 3-(2-{3-[2-(3-mercapto-phenyl)-4,4,6-trimethyl-[1,3,2]dioxasilinan-2-yloxy]-2-methyl-propoxy}-4,4,6-trimethyl-[1,3,2]dioxasilinan-2-yl)-3-benzene-thiol; 3-(2-{3-[2-(3-mercapto-cyclohexyl)-4,4,6-trimethyl-[1,3,2]dioxasilinan-2-yloxy]-1,1-dimethyl-butoxy}-4,4,6-trimethyl-[1,3,2]dioxasilinan-2-yl)-cyclohexane-1-thiol; 3-({3-[2-mercapto-methyl)-5-methyl-[1,3,2]dioxasilinan-2-yloxy]-2-methyl-propoxy}-diethoxy]-silanyl)-methane-1-thiol; 3-[{3-[{3-bis-(3-hydroxy-2,2-dimethyl-propyl)-(3-mercapto-propyl)-silanyloxy]-2,2-dimethyl-propoxy}-(3-hydroxy-2,2-dimethyl-propoxy)-(3-mercapto-propyl)-silanyloxy]-2,2-dimethyl-propan-1-ol; 3-[[3-((3-hydroxy-3-phenyl-propoxy)-3-mercapto-propyl)-{3-[2-(3-mercapto-propyl)-5-phenyl-[1,3,2]dioxasilinan-2-yloxy]-2-phenyl-1-propoxy}-silanyloxy)-2-phenyl-propoxy-(3-hydroxy-2-phenyl-propoxy)-3-mercapto-propyl)-silanyl]-2-phenylpropan-1-ol; 3-[{3-[(methyl)-(3-hydroxy-2-methyl-propoxy)-(3-mercapto-propyl)-silanyloxy]-2-methyl-propoxy}-methyl)-(3-mercapto-propyl)-silanyloxy]-2-methyl-propan-1-ol and combinations thereof.

15. The composition of claim 1, wherein the mercapto-containing compound is in the amount of from about 4 to about 100 equivalents of mercapto (—SH) per one equivalent of metal in the urethane-forming organometallic catalyst.

16. The composition of claim 1, wherein the mercapto-containing compound is in the amount of from about 12 to about 25 equivalents of mercapto (—SH) per one equivalent of metal in the urethane-forming organometallic catalyst.

17. The composition of claim 1, wherein the stabilized moisture curable alkoxysilyl-containing polyurethane polymer composition further comprises a hydrolysis and condensation catalyst to catalyze moisture curing of the formed urethane, in addition to the urethane-forming catalyst (b).

18. The composition of claim 17, wherein the hydrolysis and condensation catalyst is an organometallic salt or organometallic complex.

19. The composition of claim 17, wherein the hydrolysis and condensation catalyst is selected from the group consisting of complexes obtained from acetylacetone, benzoylacetone, trifluoroacetylacetone, ethyl acetoacetate, salicylaldehyde, cyclopentanone-2-carboxylate, acetylacetoneimine, bis-acetylaceone-alkylenediimines and salicylaldehydeimine complexing with Ti, Al, Sn, Zr, Fe, Co, Mn, Ni, Bi and Zn, $Ti(OR^8)_4$, $Al(OR^8)_3$, $Zr(OR^8)_2$, $Sn(OR^8)_4$, $Sn(OR^8)_2$, $Bi(OR^8)_3Zr(O(C{=}O)R^8)_2$, $Sn(O(C{=}O)R^8)_4$, $Sn(O(C{=}O)R^8)_2$, $Bi(O(C{=}O)R^8)_3$, $R^9{}_2Sn(O(C{=}O)R^8)_2$, where $R^8$ is monovalent alkyl or aryl of from 1 to 18 carbon atoms and $R^9$ is monovalent alkyl or aryl of from 1 to 18 carbon atoms; dibutyltin diacetate, dibutyltin dilaurate, dibutyltin maleate, dilauryltin diacetate, dioctyltin diacetate, dibutyltin-bis(4-methylaminobenzoate), dibutyltin-bis(6-methylaminocaproate), trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-dimethylaminopentylate), dibutyltin dichloride, dioctyltin dichloride and combinations thereof.

20. The composition of claim 18, where the hydrolysis and condensation catalyst is in the amount of from about 0.02 to about 1.0 weight percent metal t, based on weight of the alkoxysilyl-containing polyurethane polymer, wherein the metal is the metal portion of the organometallic catalyst.

21. The composition of claim 20, wherein the hydrolysis and condensation catalyst is in the amount of from about 0.05 to about 0.3 weight percent metal, based on weight of the alkoxysilyl-containing polyurethane polymer, wherein the metal is the metal portion of the organometallic catalyst.

22. The composition of claim 1, further comprising at least one additional additive.

23. The composition of claim 22, wherein the composition is a moisture curable composition selected from the group consisting of a coating, adhesive, sealant, consumer good or industrial good.

24. The composition of claim 1, wherein the mercapto-containing compound is present in an effective amount to increase the stability when exposure up to about 50% relative humidity for 12 days, as compared to the composition without the effective amount of mercapto-containing compound.

25. A process for preparing the composition of claim 1 comprising:

(i) reacting a polyol with an isocyanato-containing alkoxysilane in the presence of a urethane-forming catalyst to form a alkoxysilyl-containing polyurethane polymer composition; and (ii) adding a mercapto-containing compound to the product of step (i) to form a stabilized moisture-curable alkoxysilyl-containing polyurethane polymer composition.

26. A process for preparing the composition of claim 1 comprising:

(i) reacting a polyol with an excess of polyisocyanate in the presence of a urethane-forming catalyst to form an isocyanato-containing polyurethane prepolymer composition;

(ii) reacting the isocyanato-containing polyurethane prepolymer of step (i) with an amino-containing alkoxysilane to form an alkoxysilyl-containing polyurethane polymer composition;

(iii) adding a mercapto-containing compound to the product of step (i) or step (ii) to form a stabilized moisture-curable alkoxysilyl-containing polyurethane polymer composition.

* * * * *